(12) United States Patent
Fung et al.

(10) Patent No.: US 7,974,923 B2
(45) Date of Patent: Jul. 5, 2011

(54) EXTENSIBLE RIGHTS EXPRESSION PROCESSING SYSTEM

(75) Inventors: Joseph Zhung Yee Fung, Cerritos, CA (US); Robert Chancellor, Ladera Ranch, CA (US); Thomas DeMartini, Culver City, CA (US); Mai Nguyen, Buena Park, CA (US); Thanh Ta, Huntington Beach, CA (US); Vincent Hsiang Tieu, Torrance, CA (US); Duc Tran, Westminster, CA (US); Edgardo Valenzuela, South Gate, CA (US)

(73) Assignee: Contentguard Holdings, Inc., Wilmington, DE (US)

( * ) Notice: Subject to any disclaimer, the term of this patent is extended or adjusted under 35 U.S.C. 154(b) by 2192 days.

(21) Appl. No.: 10/298,220

(22) Filed: Nov. 18, 2002

(65) Prior Publication Data
US 2003/0144869 A1    Jul. 31, 2003

Related U.S. Application Data

(60) Provisional application No. 60/331,619, filed on Nov. 20, 2001, provisional application No. 60/331,622, filed on Nov. 20, 2001, provisional application No. 60/359,646, filed on Feb. 27, 2002, provisional application No. 60/359,661, filed on Feb. 27, 2002.

(51) Int. Cl.
*G06F 21/00* (2006.01)
(52) U.S. Cl. ............... 705/51; 705/50; 705/52; 705/53; 705/54; 705/55; 705/56; 705/57; 705/58; 705/59; 395/157; 395/164; 395/188; 395/200; 395/186; 395/218
(58) Field of Classification Search .............. 705/50–59; 395/157, 164, 188, 200, 186, 218; 235/380; 380/4
See application file for complete search history.

(56) References Cited

U.S. PATENT DOCUMENTS
4,159,468 A    6/1979   Barnes et al.
(Continued)

FOREIGN PATENT DOCUMENTS
BR    9810967 A    10/2001
(Continued)

OTHER PUBLICATIONS

An XML-enabled data extraction toolkit for web sources Ling Liu, Calton Pu and Wei Han; College of Computing, Georgia Institute of Technology, Atlanta, GA 30332, USA A; Available online Aug. 28, 2001.*

(Continued)

*Primary Examiner* — Calvin Loyd Hewitt, II
*Assistant Examiner* — Cristina Owen Sherr
(74) *Attorney, Agent, or Firm* — Marc S. Kaufman; Stephen M. Hertzler; Reed Smith LLP

(57) ABSTRACT

Extensible grammar-based rights expression system for processing rights expressions including an interpreter with plug-in subcomponents, a validator, and a framework. In another embodiment, system includes a framework having an extensible architecture with extensibility points for adding extensions to the grammar, and an interpreter, the extensions defining semantics and syntax of new rights expressions. A method for processing rights expressions is also provided having the steps of registering plug-in components, making a programmatic call, finding and invoking appropriate plug-in components, evaluating the request against the grant, and returning an authorization result. In another embodiment, method includes the steps of providing an extensible grammar-based rights expression system having an extensible architecture with an interpreter, evaluating the request against the grant using the interpreter, and returning an authorization result. The method may include the step of adding new extensions to the rights expression system to allow processing of new rights expressions.

47 Claims, 13 Drawing Sheets

U.S. PATENT DOCUMENTS

| | | |
|---|---|---|
| 4,200,700 A | 4/1980 | Mäder |
| 4,361,851 A | 11/1982 | Asip et al. |
| 4,423,287 A | 12/1983 | Zeidler |
| 4,429,385 A | 1/1984 | Cichelli et al. |
| 4,621,321 A | 11/1986 | Boebert et al. |
| 4,736,422 A | 4/1988 | Mason |
| 4,740,890 A | 4/1988 | William |
| 4,796,220 A | 1/1989 | Wolfe |
| 4,816,655 A | 3/1989 | Musyck et al. |
| 4,888,638 A | 12/1989 | Bohn |
| 4,937,863 A | 6/1990 | Robert et al. |
| 4,953,209 A | 8/1990 | Ryder et al. |
| 4,977,594 A | 12/1990 | Shear |
| 5,014,234 A | 5/1991 | Edwards |
| 5,129,083 A | 7/1992 | Cutler et al. |
| 5,138,712 A | 8/1992 | Corbin |
| 5,174,641 A | 12/1992 | Lim |
| 5,204,897 A * | 4/1993 | Wyman .............. 705/59 |
| 5,247,575 A | 9/1993 | Sprague et al. |
| 5,260,999 A | 11/1993 | Wyman |
| 5,276,444 A | 1/1994 | McNair |
| 5,287,408 A | 2/1994 | Samson |
| 5,291,596 A | 3/1994 | Mita |
| 5,293,422 A | 3/1994 | Loiacono |
| 5,335,275 A | 8/1994 | Millar et al. |
| 5,337,357 A | 8/1994 | Chou et al. |
| 5,386,369 A | 1/1995 | Christiano |
| 5,390,297 A | 2/1995 | Barber et al. |
| 5,414,852 A | 5/1995 | Kramer et al. |
| 5,438,508 A * | 8/1995 | Wyman .............. 705/8 |
| 5,453,601 A | 9/1995 | Rosen |
| 5,485,577 A | 1/1996 | Eyer et al. |
| 5,504,816 A | 4/1996 | Hamilton et al. |
| 5,530,235 A | 6/1996 | Stefik et al. |
| 5,535,276 A | 7/1996 | Ganesan |
| 5,553,143 A | 9/1996 | Ross et al. |
| 5,557,678 A | 9/1996 | Ganesan |
| 5,564,038 A | 10/1996 | Grantz et al. |
| 5,619,570 A | 4/1997 | Tsutsui |
| 5,625,690 A | 4/1997 | Michel et al. |
| 5,629,980 A | 5/1997 | Stefik et al. |
| 5,636,346 A | 6/1997 | Saxe |
| 5,638,443 A * | 6/1997 | Stefik et al. .............. 705/54 |
| 5,638,513 A | 6/1997 | Ananda |
| 5,708,709 A | 1/1998 | Rose |
| 5,715,403 A | 2/1998 | Stefik |
| 5,745,879 A | 4/1998 | Wyman |
| 5,764,807 A | 6/1998 | Pearlman et al. |
| 5,765,152 A | 6/1998 | Erickson |
| 5,787,172 A | 7/1998 | Arnold |
| 5,790,677 A | 8/1998 | Fox et al. |
| 5,812,664 A | 9/1998 | Bernobich et al. |
| 5,825,876 A | 10/1998 | Peterson |
| 5,825,879 A | 10/1998 | Davis |
| 5,838,792 A | 11/1998 | Ganesan |
| 5,848,154 A | 12/1998 | Nishio et al. |
| 5,848,378 A | 12/1998 | Shelton et al. |
| 5,850,443 A | 12/1998 | Van Oorschot et al. |
| 5,892,900 A * | 4/1999 | Ginter et al. .............. 713/200 |
| 5,915,019 A | 6/1999 | Ginter et al. |
| 5,917,912 A | 6/1999 | Ginter et al. |
| 5,933,498 A | 8/1999 | Schneck et al. |
| 5,940,504 A | 8/1999 | Griswold |
| 5,982,891 A | 11/1999 | Ginter et al. |
| 5,987,134 A | 11/1999 | Shin et al. |
| 5,999,624 A | 12/1999 | Hopkins |
| 6,006,332 A | 12/1999 | Rabne et al. |
| 6,020,882 A | 2/2000 | Kinghorn et al. |
| 6,047,067 A | 4/2000 | Rosen |
| 6,073,234 A | 6/2000 | Kigo et al. |
| 6,091,777 A | 7/2000 | Guetz et al. |
| 6,112,239 A | 8/2000 | Kenner et al. |
| 6,135,646 A | 10/2000 | Kahn et al. |
| 6,141,754 A | 10/2000 | Choy |
| 6,157,719 A | 12/2000 | Wasilewski et al. |
| 6,169,976 B1 | 1/2001 | Colosso |
| 6,185,683 B1 | 2/2001 | Ginter et al. |
| 6,189,037 B1 | 2/2001 | Adams et al. |
| 6,189,146 B1 | 2/2001 | Misra et al. |
| 6,209,092 B1 | 3/2001 | Linnartz |
| 6,216,112 B1 | 4/2001 | Fuller et al. |
| 6,219,652 B1 | 4/2001 | Carter et al. |
| 6,236,971 B1 | 5/2001 | Stefik et al. |
| 6,307,939 B1 | 10/2001 | Vigarie |
| 6,353,888 B1 | 3/2002 | Kakehi et al. |
| 6,397,333 B1 | 5/2002 | Söhne et al. |
| 6,401,211 B1 | 6/2002 | Brezak, Jr. et al. |
| 6,405,369 B1 | 6/2002 | Tsuria |
| 6,424,717 B1 | 7/2002 | Pinder et al. |
| 6,424,947 B1 | 7/2002 | Tsuria et al. |
| 6,487,659 B1 | 11/2002 | Kigo et al. |
| 6,516,052 B2 | 2/2003 | Voudouris |
| 6,516,413 B1 | 2/2003 | Aratani et al. |
| 6,523,745 B1 | 2/2003 | Tamori |
| 6,796,555 B1 | 9/2004 | Blahut |
| 6,895,392 B2 * | 5/2005 | Stefik et al. .............. 705/51 |
| 2001/0009026 A1 | 7/2001 | Terao et al. |
| 2001/0011276 A1 | 8/2001 | Durst, Jr. et al. |
| 2001/0014206 A1 | 8/2001 | Artigalas et al. |
| 2001/0037467 A1 | 11/2001 | O'Toole, Jr. et al. |
| 2001/0039659 A1 | 11/2001 | Simmons et al. |
| 2002/0001387 A1 | 1/2002 | Dillon |
| 2002/0035618 A1 | 3/2002 | Mendez et al. |
| 2002/0044658 A1 | 4/2002 | Wasilewski et al. |
| 2002/0056118 A1 | 5/2002 | Hunter et al. |
| 2002/0069282 A1 | 6/2002 | Reisman |
| 2002/0099948 A1 | 7/2002 | Kocher et al. |
| 2002/0127423 A1 | 9/2002 | Kayanakis |
| 2003/0097567 A1 | 5/2003 | Terao et al. |
| 2004/0052370 A1 | 3/2004 | Katznelson |
| 2004/0172552 A1 | 9/2004 | Boyles et al. |

FOREIGN PATENT DOCUMENTS

| | | |
|---|---|---|
| EP | 0 067 556 B1 | 12/1982 |
| EP | 0 257 585 A2 | 3/1988 |
| EP | 0 262 025 A2 | 3/1988 |
| EP | 0 332 304 A2 | 9/1989 |
| EP | 0 393 806 A2 | 10/1990 |
| EP | 0 450 841 A2 | 10/1991 |
| EP | 0 529 261 A2 | 3/1993 |
| EP | 0 613 073 A1 | 8/1994 |
| EP | 0 678 836 A1 | 10/1995 |
| EP | 0 679 977 A1 | 11/1995 |
| EP | 0 715 243 A1 | 6/1996 |
| EP | 0 715 244 A1 | 6/1996 |
| EP | 0 715 245 A1 | 6/1996 |
| EP | 0715246 A1 | 6/1996 |
| EP | 0 731 404 A1 | 9/1996 |
| EP | 0 763 936 A2 | 3/1997 |
| EP | 0 818 748 A2 | 1/1998 |
| EP | 0 840 194 A2 | 5/1998 |
| EP | 0 892 521 A2 | 1/1999 |
| EP | 0 934 765 A1 | 8/1999 |
| EP | 0 946 022 A2 | 9/1999 |
| EP | 0 964 572 A1 | 12/1999 |
| EP | 1 103 922 A2 | 5/2001 |
| GB | 1483282 | 8/1977 |
| GB | 2022969 A | 12/1979 |
| GB | 2236604 A | 4/1991 |
| GB | 2309364 A | 7/1997 |
| GB | 2316503 A | 2/1998 |
| GB | 2354102 A | 3/2001 |
| JP | 3-063717 | 3/1991 |
| JP | 5-100939 | 4/1993 |
| JP | 5168039 A2 | 7/1993 |
| JP | 6-131371 A | 5/1994 |
| JP | 7-36768 | 2/1995 |
| JP | 11031130 A2 | 2/1999 |
| JP | 11032037 A2 | 2/1999 |
| JP | 11205306 A2 | 7/1999 |
| JP | 11215121 A2 | 8/1999 |
| JP | 2000215165 A2 | 8/2000 |
| JP | 2005218143 A2 | 8/2005 |
| JP | 2005253109 A2 | 9/2005 |
| JP | 2006180562 A2 | 7/2006 |
| WO | WO 83/04461 A1 | 12/1983 |
| WO | WO 92/20022 A1 | 11/1992 |

| | | |
|---|---|---|
| WO | WO 93/01550 A1 | 1/1993 |
| WO | WO 93/11480 A1 | 6/1993 |
| WO | WO 94/03003 A1 | 2/1994 |
| WO | WO 96/13814 A1 | 5/1996 |
| WO | WO 96/24092 A2 | 8/1996 |
| WO | WO 96/27155 A2 | 9/1996 |
| WO | WO 97/25800 A1 | 7/1997 |
| WO | WO 97/37492 A1 | 10/1997 |
| WO | WO 97/41661 A2 | 11/1997 |
| WO | WO 97/43761 A2 | 11/1997 |
| WO | WO 98/09209 A1 | 3/1998 |
| WO | WO 98/10561 A1 | 3/1998 |
| WO | WO 98/11690 A1 | 3/1998 |
| WO | WO 98/19431 A1 | 5/1998 |
| WO | WO 98/43426 A1 | 10/1998 |
| WO | WO 98/45768 A1 | 10/1998 |
| WO | WO 99/24928 A2 | 5/1999 |
| WO | WO 99/34553 A1 | 7/1999 |
| WO | WO 99/35782 A1 | 7/1999 |
| WO | WO 99/48296 A1 | 9/1999 |
| WO | WO 99/60461 A1 | 11/1999 |
| WO | WO 99/60750 A2 | 11/1999 |
| WO | WO 00/04727 A2 | 1/2000 |
| WO | WO 00/05898 A2 | 2/2000 |
| WO | WO 00/46994 A1 | 8/2000 |
| WO | WO 00/54128 | 9/2000 |
| WO | WO 00/59152 A2 | 10/2000 |
| WO | WO 00/62260 A1 | 10/2000 |
| WO | WO 00/72118 A1 | 11/2000 |
| WO | WO 00/73922 A2 | 12/2000 |
| WO | WO 01/03044 A1 | 1/2001 |
| WO | WO 01/37209 A1 | 5/2001 |
| WO | WO 2004/034223 A2 | 4/2004 |
| WO | WO 2004/103843 | 12/2004 |

OTHER PUBLICATIONS

Using plug-ins and Internet browser extensions, Home Healthc Nurse Manag. Sep.-Oct. 2000;4(5):22-5.*
Webopedia, definition of plug-ins.*
Webopedia, definition of plug-ins, Jun. 7, 2006.*
PCT International Search Report (second sheet) dated Apr. 22, 2003 (PCT/US02/37080).
Contentguard; "The Need for a Rights Language—Technology White Paper—Version 1.0"; Contentguard White Paper, 'Online!; Nov. 9, 2001; XP-002333474; pp. 1-12.
Contentguard; "XrML: Extensible rights Markup Language—Version 1.2"; Contentguard XRML 1.2, 'Online!; Oct. 30, 2001; XP-002333475; http://www.xrml.org, pp. 1-134.
David C. Fallside; "XML Schema Part 0: Primer" W3C Recommendation, May 2, 2001; 'Online!; XP-002333743.
Supplementary European Search Report; mailed on Aug. 31, 2005 (EP 02 78 6739).
Johnson et al., "A Secure Distributed Capability Based System," Proceedings of the 1985 ACM Annual Conference on the Range of Computing: Mid-80's Perspective: Mid-80's Perspective *Association for Computing Machinery* pp. 392-402 (1985).
Blaze et al, "Divertible Protocols and Atomic Proxy Cryptography" 1998 Advances in Cryptography—Euro Crypt International Conference on the Theory and Application of Crypto Techniques, Springer Verlag, DE.
Blaze et al, "Atomic Proxy Cryptography" Draft (Online) (Nov. 2, 1997) XP002239619 Retrieved from the Internet.
No Author, "Capability- and Object-Based Systems Concepts," Capability-Based Computer Systems, pp. 1-19 (no date).
Cox, "Superdistribution" Wired Magazine (Sep. 1994) XP002233405 URL:http://www.wired.com/wired/archive/2.09/superdis_pr.html>.
Dunlop et al, Telecommunications Engineering, pp. 346-352 (1984).
Elgamal, "A Public Key Cryptosystem and a Signature Scheme Based on Discrete Logarithms," IEEE Transactions on Information Theory IT-31(4):469-472 (Jul. 1985).
Gheorghiu et al., "Authorization for Metacomputing Applications" (no date).
Iannella, ed., Open Digital Rights Language (ODRL), pp. 1-31 (Nov. 21, 2000).

Kahle, wais.concepts.txt, Wide Area Information Server Concepts, Thinking Machines Version 4, Draft, pp. 1-18 (Nov. 3, 1989).
Kahn, "Deposit, Registration and Recordation in an Electronic Copyright Management System," Technical Report, Corporation for National Research Initiatives, Reston, Virginia (Aug. 1992) URL:http://www.cni.org/docs/ima.ip-workshop/kahn.html.
Kai-In et al, "The Digital Library Project, vol. 1: The World of Knowbots (Draft), An Open Architecture for a Digital Library System and a Plan for its Development," Corporation for National Research Initiatives, pp. 1-48 (Mar. 1988).
Kohl et al, Network Working Group Request for Comments: 1510, pp. 1-112 (Sep. 1993).
Lee et al, CDMA Systems Engineering Handbook (1998) [excerpts but not all pages numbered].
Mambo et al, "Protection of Data and Delegated Keys in Digital Distribution," Information Security and Privacy. Second Australian Conference, ACISP '97 Proceedings, pp. 271-282 (Sydney, NSW, Australia, Jul. 7-9, 1997, 1997 Berlin, Germany, Springer-Verlag, Germany), XP008016393 ISBN: 3-540-63232-8.
Mambo et al, "Proxy Cryptosystems: Delegation of the Power to Decrypt Ciphertexts,", IEICE Trans. Fundamentals vol. E80-A, No. 1:54-63 (Jan. 1997) XP00742245 ISSN: 0916-8508.
Microsoft Word, Users Guide, Version 6.0, pp. 487-489, 549-555, 560-564, 572-575, 599-613, 616-631 (1993).
Ojanperä and Prasad, eds., Wideband CDMA for Third Generation Mobile Communications (1998) [excerpts but not all pages numbered].
Perritt, "Knowbots, Permissions Headers and Contract Law," Paper for the Conference on Technological Strategies for Protecting Intellectual Property in the Networked Multimedia Environment, pp. 1-22 (Apr. 2-3, 1993 with revisions of Apr. 30, 1993).
Raggett, (Hewlett Packard), "HTML+(Hypertext markup language)," pp. 1-31 (Jul. 12, 1993) URL:http://citeseer.ist.psu.edu/correct/340709.
Samuelson et al, "Intellectual Property Rights for Digital Library and Hypertext Publishing Systems: An Analysis of Xanadu," Hypertext '91 Proceedings, pp. 39-50 (Dec. 1991).
No Author, "Softlock Services Introduces . . . Softlock Services" Press Release (Jan. 28, 1994).
No Author, "Appendix III—Compatibility with HTML," No Title, pp. 30-31 (no date).
No Editor, No Title, Dictionary pages, pp. 469-472, 593-594 (no date).
Benoit, Digital Television MPEG-1, MPEG-2 and Principles of the DVB System, pp. 75-80, 116-121 (no date).
Benoit, Digital Television MPEG-1, MPEG-2 and Principles of the DVB System, $2^{nd}$ edition, pp. 74-80 (no date).
AH Digital Audio and Video Series, "DTV Receivers and Measurements," Understanding Digital Terrestrial Broadcasting, pp. 159-164 (no date).
O'Driscoll, The Essential Guide to Digital Set-Top Boxes and Interactive TV, pp. 6-24 (no date).
IUS Mentis, "The ElGamal Public Key System," pp. 1-2 (Oct. 1, 2005) online at http://www.iusmentis.com / technology/ encyrption/ elgamal/.
Schneier, "Crypto Bibliography," Index of Crypto Papers Available Online, pp. 1-2 (online) (no date).
No Author, No Title, pp. 344-355 (no date).
No Author, "Part Four Networks," No Title, pp. 639-714 (no date).
Microsoft Word User's Guide, pp. 773-774, 315-316, 487-489, 561-564, 744, 624-633 (1993).
No Author, "What is the ElGamal Cryptosystem," p. 1 (Nov. 27, 2006) online at http://www.x5.net/faqs/crpto/q29.html.
Johnson et al., "A Secure Distributed Capability Based System," ACM, pp. 392-402 (1985).
Wikipedia, "El Gamal Encyption," pp. 1-3 (last modified Nov. 2, 2006) online at http://en.wikipedia.org/wiki/ElGamal_encryption.
Blaze, "Atomic Proxy Cryptography," p. 1 Abstract (Oct. 20, 1998).
Blaze, "Matt Blaze's Technical Papers," pp. 1-6 (last updated Aug. 6, 2006)].

Online Search Results for "inverted file", "inverted index" from www.techweb.com, www.cryer.co.uk, computing-dictionary.thefreedictionary.com, www.nist.gov, en.wikipedia.org, www.cni.org, www.tiscali.co.uk (Jul. 15-16, 2006).

Corporation for National Research Initiatives, "Digital Object Architecture Project", http://www.nnri.reston.va.us/doa.html (updated Nov. 28, 2006).

Stefik, Summary and Analysis of A13 (Kahn, Robert E and Vinton G Cerf, "The Digital Library Project, vol. 1: The World of Knowbots (Draft), An Open Architecture for a Digital Library System and a Plan for its Development," Corporation for National Research Initiatives (Mar. 1988)), pp. 1-25 (May 30, 2007).

Delaigle, "Digital Watermarking," Spie Conference in Optical Security and Counterfeit Deterrence Techniques, San Jose, CA (Feb. 1996).

Perritt, "Technologies Strategies for Protecting Intellectual Property in the Networked Multimedia Environment," Knowbots, Permissions Headers and Contract Law (Apr. 2-3, 1993).

ContentGuard: "ContentGuard XrML Software Development kit User's Guide Release 2.0"Internet Citation XP00233347, URL:http://web.archive.org/web/20011202143245/http://contentguar.com, retrieved on Jun. 15, 2005.

* cited by examiner

© 2001 ContentGuard Holdings, Inc.

© 2001 ContentGuard Holdings, Inc.

EXTENSIBLE RIGHTS EXPRESSION PROCESSING SYSTEM

This application claims priority to U.S. provisional applications Ser. No. 60/331,619 filed Nov. 20, 2001, Ser. No. 60/331,622 filed Nov. 20, 2001, Ser. No. 60/359,646 filed Feb. 27, 2002, and Ser. No. 60/359,661 filed Feb. 27, 2002, all of which are incorporated herein by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention is directed to rights expression processing systems and methods for processing rights expressions. In particular, the present invention is directed to an extensible grammar based rights expression system and method to allow processing of new rights expressions.

2. Discussion of the Related Art

Digital distribution of content by content owners over the Internet is a way to reach out to a potentially large market of Internet users. However, such digital distribution comes with a risk of illegal, or otherwise unauthorized, distribution of the content. Rights Management helps reduce this risk thereby enabling content owners to protect and profit from their digital content. A Rights Management System is utilized to specify the usage rights for content, or other things and to enforce the usage rights. The term "content" is used broadly herein and includes digital works such as music, audio files, text files, books, reports, video, multimedia, pictures, executable code, or any combination thereof.

Various implementations of Rights Management Systems and rights associated with digital content are known as disclosed by U.S. Pat. No. 5,629,980, U.S. Pat. No. 5,634,012, U.S. Pat. No. 5,638,443, and U.S. Pat. No. 5,715,403. Hence, the details of Rights Management Systems are not discussed specifically herein. As evident from these references, a Rights Management system can take many forms, and can employ varying levels of complexity depending on the security required, the nature of the thing being managed, the complexity of associated rights and conditions, volume and other factors.

FIG. 12 illustrates an example Rights Management system 500 and the associated workflow that can be used to distribute digital content. Typically, when a user goes through an activation process, information is exchanged between activation server 502 and client application 506, and is downloaded and installed in client application 506. Client application 506 serves as a tamper resistant security component and contains the set of public and private keys 504 that are issued by activation server 502 as well as other components such as any necessary engine for parsing or rendering protected content 508.

The Rights Management system 500 also includes a content preparation application 503 that protects clear content 501 through encryption or other protective mechanism to thereby provide protected content 508. The content preparation application 503 also specifies usage rights in a rights label 510 that is associated with protected content 508. The rights label 510 and specifies usage rights that are available to an end-user when corresponding conditions are satisfied. A rights expression language (herein after "REL") such as XrML™ may be used to specify the rights and conditions set forth in the rights label 510. The rights label 510 and the appropriate encryption key that was used to encrypt the clear content 501 is then provided to the license server 512.

The license server 512 manages the encryption keys and issues license 514 that allows exercise of usage rights. For example, rights label 510 may include usage rights for viewing protected content 508 upon payment of a fee of five dollars, and viewing or printing protected content 508 upon payment of a fee of ten dollars. Client application 506 interprets and enforces the usage rights that have been specified in license 514 to provide clear content 516 that may be used by the end user.

The components and modules of the Rights Management system 500 can be located in one or more than one device. For example, the activation server 502 and the license server 512 could be the same server or other device, or plural separate devices. The protected content 508 may be any type of content including a document, image, audio file, video file, etc. Further details of Rights Management systems are set forth in further detail in the references noted above, and consequently, are not discussed specifically herein.

Thus, Rights Management systems not only protect content, but also enable content owners to manage the sale and use of their content by means of licenses. Licenses include rights expressions to articulate usage rights and to associate usage rights to a content. Licenses may be specified for different stages during the life cycle of digital content. For example, when digital content is released to a distributor, licenses may be specified by content owners to limit distribution of the digital content to a particular region or a period of time, or to restrict how content may be repackaged. Of course, licenses themselves must be protected as well since they are a controlling facet determinative of how content is used. In this regard, licenses are typically digitally signed by the issuers so that their integrity and authenticity may be verified before being interpreted.

A license typically includes a grant element, a principal element, a right element, a resource element, and optionally, a condition element. In particular, a license contains one or more grant elements which defines the details of the usage rights granted. The one or more grant elements may specify a principal element, a rights element, a resource element and, optionally, a condition element. The principal element identifies a principal (user) or a group of principals who is/are granted the right to access or use the protected resources, while the rights element names a specific right (e.g. play, view, print, copy) to be given to the principal with regards to accessing or using the protected resources. The resource element specifies the protected resources, and the optional condition element specifies any conditions that are imposed on the right to use the protected resource.

A license is typically embodied as a rights expression. A rights expression is a syntactically and semantically correct language construct, based on a defined grammar, to convey rights information. As noted, an example of a rights expression language is XrML™. It is important to note that the term "rights expression" as used herein is not be limited to licenses in particular, but refers to any expressions that may be used by the Rights Management system to convey information. Thus, the term "rights expression" and derivatives thereof as used herein generally refers to expression of licenses, license components and/or fragments (such as the grant element, principal element, right element, resource element, and/or condition element), as well as any other appropriate expressions. Moreover, rights expressions may be in a variety of different forms ranging from binary encoded sequences that target resource constrained applications, to multi-level REL construct that describes complex rights information for managed distribution of digital resources and rights granting paradigms.

SUMMARY OF THE INVENTION

In accordance with one aspect of the present invention, an extensible grammar-based rights expression system for processing one or more rights expressions is provided, the system comprising an interpreter adapted to evaluate the rights expressions, the interpreter including one or more plug-in subcomponents configured to allow evaluation of the rights expressions, a validator adapted to validate compliance with conditions set forth in the one or more rights expressions upon authorization by the interpreter, and a framework adapted provide an interface between the interpreter and the validator.

In accordance with another aspect of the present invention, an extensible grammar-based rights expression system is provided for processing one or more rights expressions, the system comprising a framework having an extensible architecture with one or more extensibility points for adding extensions to the grammar, and an interpreter adapted to evaluate the one or more rights expressions, wherein the extensions define semantics and syntax of new rights expressions to allow processing of the new rights expressions.

In accordance with still another aspect of the present invention, a method for processing one or more rights expressions is provided. The one or more rights expressions include a request that requests a usage right associated with a resource for a principal, and a grant that issues a usage right associated with a resource to a principal. The method comprises the steps of registering plug-in components with a framework, making a programmatic call to the framework to authorize requests for usage rights set forth in the one or more rights expressions, finding one or more appropriate plug-in components configured to evaluate each of the requests set forth in the one or more rights expressions, invoking the appropriate plug-in components, evaluating the request against the grant, and returning an authorization result that indicates whether the request is authorized by the grant.

Yet another aspect of the present invention is in providing a method for processing one or more rights expressions comprising the steps of providing an extensible grammar-based rights expression system having an extensible architecture with an interpreter adapted to evaluate the one or more rights expressions, evaluating the request against the grant using the interpreter, and returning an authorization result that indicates whether the request is authorized by the grant. Preferably, the method further includes the step of adding new extensions to the extensible grammar-based rights expression system to allow processing of new rights expressions, wherein the extensions define semantics and syntax of the new rights expressions.

DETAILED DESCRIPTION OF THE INVENTION

Rights Management systems can be applied to digital content and other items, such as services, goods, and the like. For example, rights and conditions can be associated with any physical or non-physical thing, object, class, category, service, or other items for which access, distribution, execution, or other use is to be controlled, restricted, recorded, metered, charged, monitored or otherwise managed in some fashion. Thus, a Rights Management system can be used, for example, to specify and enforce usage rights and condition for any item such as content, service, software program, goods etc. In this regard, to extend the concept of rights management to tangible items, an item ticket can be used to associate usage rights with the item. A license or other rights expression is associated with the item ticket 600, illustrated in FIG. 13, with a ticket specification that points to or otherwise indicates the item ticket. The item ticket 600 can be protected with some crypto algorithm or other mechanism for preventing processing or rendering of item ticket 600 except in accordance with an associated license. The item ticket 600, with the security mechanism unlocked, can be a human readable or computer readable coupon, a code, a document, or the like. Accordingly, the phrase "item ticket" refers to any tangible or intangible indication of an item. The item ticket specifies one or more items and thus, usage rights and conditions can be associated with any item including, objects, classes, categories, and services, for which use, access, distribution, or execution is to be controlled, restricted, recorded, metered, charged, monitored, or otherwise managed in some fashion as previously noted.

Figure 13:
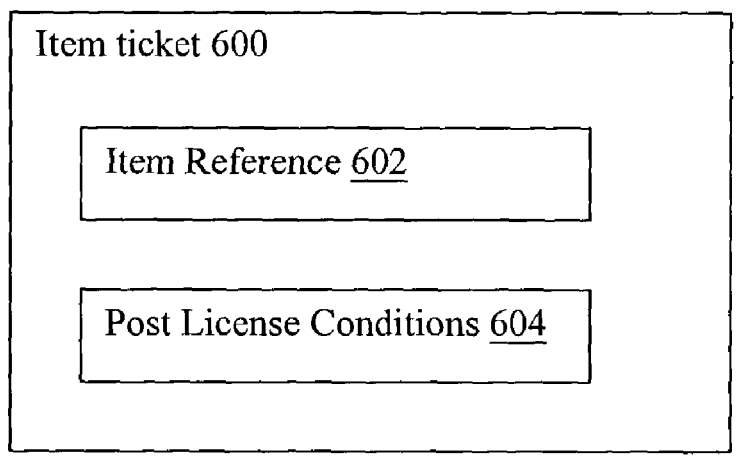
FIG. 13 is a schematic illustration of an item.

As illustrated in FIG. 13, the item ticket 600 can be prepared by specifying an item reference 602 and any post license conditions 604 that restrict redemption of the item ticket 600. The item ticket 600 can be linked to the item through the item reference 602. The term "linked" as used herein refers to any type of association, such as description, a pointer, or the like. For example, the item ticket 600 can include a unique code associated with an item through a database record. When the code is presented to a vendor, the database is searched and the corresponding item can be delivered. Item ticket 600 can also include a human readable description of the item and any post license condition 604 not yet satisfied such as certain location or time the item ticket 600 may be redeemed. Access to the item 600 can be controlled using a license in the manner described above with respect to content. Further details of Rights Management systems utilizing item tickets are disclosed in U.S. application Ser. No. 10/159,272 entitled METHOD AND APPARATUS FOR DISTRIBUTING ENFORCEABLE PROPERTY RIGHTS that was filed on Jun. 3, 2002, the disclosure of which is incorporated herein by reference.

Regardless of the details of the item, and whether the item is a digital content, an object, a class, a category, a service, or other items, the task of writing valid licenses, and designing and implementing rights expression processing systems is complicated and difficult. Various challenges are encountered in supporting the dynamic aspects of rights expressions and application environments. In particular, rights expressions may be static or dynamic. Static rights expressions are statically defined to describe fixed rights information, and therefore, may not be extended. Dynamic rights expressions however, allow new syntaxes to be added without changing the semantics or grammars of the rights expressions. For example, vendors in the wireless content distribution industry may desire to create a new right, such as a "broadcast" right, to grant Rights Management supported distributors the right to "push" rights-managed contents onto subscribers' devices. Constantly changing technology and business paradigms drive the creation of new types of rights. Without an extensible rights expression processing system, different static systems must be designed and implemented to accommodate new rights expression extensions, variations, and derivations thereof.

Thus, a rights expression processing system should preferably be extensible to allow accommodation of new rights information that is not currently defined at the time the system is designed and implemented. Consequently, it is desirable to provide an extensible rights expression processing system implemented using an extensible architecture so that it can be used to generate, modify, authorize, and validate rights expressions, whether the rights expressions are static or dynamic without the requirement for a redesign of the rights expression or any underlying schema or data dictionary. As described herein, the extensible architecture of the extensible rights expression processing system allows dynamic processing of extended rights expressions and new rights expressions.

Figure 1:
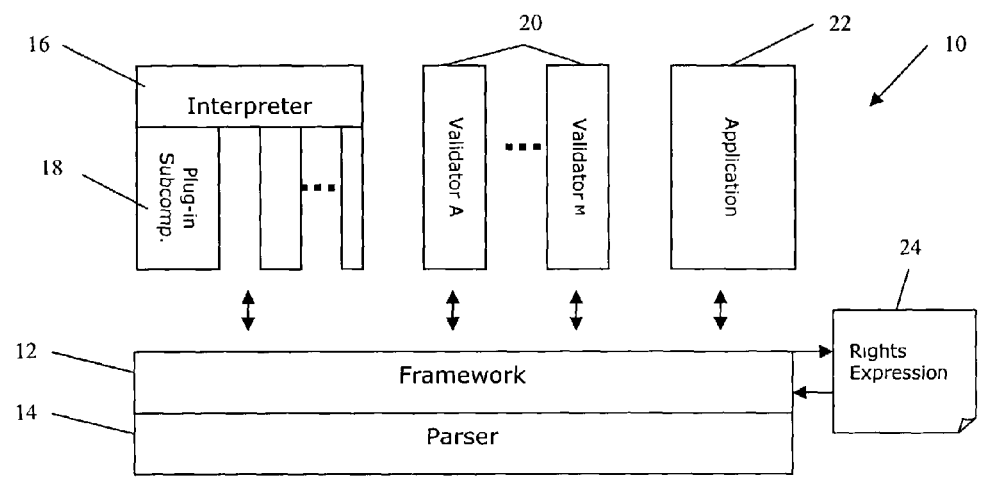
FIG. 1 is a block diagram of an extensible rights expression processing system in accordance with one embodiment of the present invention.

FIG. 1 shows a block diagram of a rights expression processing system 10 in accordance with one embodiment of the present invention that may be used to generate, modify, authorize, and/or validate grammar based rights expressions. As evident from the discussion below, the rights expression processing system 10 is extensible to allow new syntaxes to be added without changing semantics or grammars of existing rights expressions to thereby allow accommodation of new rights expressions. It should be initially noted that whereas the illustrated embodiment is referred to herein as a rights expression processing system, the present invention may be implemented in any system or device having the architecture described herein. In this regard, the rights expression processing system 10 may be implemented with any type of hardware and software, and may be a pre-programmed general purpose computing device. For example, the rights expression processing system 10 may be implemented using a personal computer, a portable computer, a thin client, etc. The rights expression processing system 10 may be a single device at a single location or multiple devices at a single, or multiple, locations that are connected together using any appropriate communication protocols over any communication medium such as electric cable, fiber optic cable, any other cable, or in a wireless manner using radio frequency, infrared, or other technologies.

It should also be noted that the rights expression processing system 10 in accordance with one embodiment of the present invention is illustrated and discussed herein as having a plurality of components which perform particular functions. It should be understood that these components are merely schematically illustrated based on their function for clarity purposes only, and do not necessarily represent specific hardware or software. These components may be hardware and/or software implemented to substantially perform the particular functions explained. Moreover, two or more of these components may be combined together within the rights expression processing system 10, or divided into more components based on the particular function desired. Thus, the present invention as embodied in FIG. 1 should not be construed to limit the rights expression processing system 10 of the present invention.

In the illustrated embodiment, the rights expression processing system 10 includes a framework 12 that allows interfacing of the other components of the rights expression processing system 10. The framework 12 is the infrastructure component of the rights expression processing system 10 that orchestrates the interactions among all the other components of the system and the rights expression-processing functions performed by the various components. Preferably, the framework 12 of the rights expression processing system 10 is rights expression-agnostic, i.e. the framework 12 is not tied to any specific syntax or grammar of rights expressions. Moreover, the framework 12 has an extendible architecture with extensibility points that allows various other components to be added thereto to allow processing of new rights expressions. Of course, in other embodiments, the framework need not be provided with an extendible architecture with extensibility points, but instead, may be implemented with fixed components.

The rights expression processing system 10 of the illustrated embodiment also includes a parser 14 adapted to allow parsing and manipulation of data. In particular, the parser 14 is a component that carries out the underlying manipulation operations such as input, output, syntax validation, and manipulation of the rights expression 24 to be processed by the rights expression processing system 10. Preferably, the parser 14 is generic and implemented as a plug-in component that could be replaced by another parser of compatible capability without affecting the behavior of the rights expression processing system 10.

Again, the term "rights expression" as used herein is not be limited to licenses in particular, but refers to any expressions that may be used by the rights expression processing system 10 to convey information. Thus, the term "rights expression" and derivatives thereof as used herein generally refers to expressions of licenses, license components and/or fragments (such as the grant element, principal element, right element, resource element, and/or condition element), as well as any other appropriate expressions.

For example, the rights expression 24 may be a grant that comprises a usage right associated with the digital resources and a principal to whom the usage right is granted. The party to whom the grant has been issued is referred to as the "principal", the object of the rights such as an e-book is referred to as the "digital resource", and the rights to use this object the "usage right". Alternatively, the rights expression 24 may be a request that comprises a usage right associated with digital resources, and a principal requesting use of the digital resources. Moreover, the rights expression 24 may include a grant as well as a request. The rights expression 24 may be expressed in any appropriate rights expression language (herein after "REL") such as XML or XrML™. In the preferred embodiment, the underlying parser 14 hides all rights expression-specific syntaxes and grammars through the use of extensible definitions, for example, the XML or XrML™ schema.

The rights expression processing system 10 of the present embodiment also includes an interpreter 16 adapted to evaluate and/or authorize rights expressions 24, and to provide an authorization result. In particular, the interpreter 16 evaluates the rights expression 24 based on the grant and/or the request set forth in the rights expression 24. The interpreter then may authorize the rights expression 24 without condition thereby authorizing consumption of the digital resources identified in the rights expression 24. Alternatively, the interpreter 16 may conditionally authorize the rights expression 24 thereby authorizing consumption of the digital resources identified in the rights expression 24 only upon the satisfaction of one or more conditions that are set forth in the rights expression 24. Moreover, the interpreter 16 may not authorize the rights expression 24 so that consumption of the digital resources identified in the rights expression 24 cannot be consumed.

In accordance with the illustrated embodiment, the interpreter 16 is implemented as a plug-in component having a plurality of plug-in subcomponents 18 which are configured to allow evaluation and/or authorization of different rights expressions 24. In addition, new plug-in subcomponents may be added to the interpreter 16 to allow evaluation and/or authorization of new rights expressions thereby allowing the interpreter 16 to be extensible. Alternatively or in addition thereto, because the rights expression processing system 10 has an extensible architecture, new interpreters may be added to the rights expression processing system 10 that are configured to evaluate and/or authorize new rights expressions.

The rights expression processing system 10 further includes one or more validators 20 adapted to validate satisfaction of conditions, if any, that may be set forth in the rights expressions being evaluated. In particular, if the above described interpreter 16 conditionally authorizes the rights expression 24, the validators 20 verify the satisfaction of the conditions prior to allowing the consumption of the digital resources identified in the rights expression 24. In the illustrated embodiment of the rights expression processing system 10, validator A through validator M are provided, each validator being configured to evaluate a specific type of condition, by verifying the value of a state variable, for example. The extensible architecture of the rights expression processing system 10 allows new validators that are configured to evaluate and/or authorize new rights expressions to be added to the rights expression processing system 10. For example, a validator N (not shown) implemented as a plug-in component may be added later to allow validation of a new condition that may be expressed in the rights expression to be processed.

Furthermore, the rights expression processing system 10 also includes a rights expression enabled component referred to herein as an application 22. The application 22 component represents the "user" of the rights expression processing system 10. The user can be a creator, a distributor, or a consumer of rights expressions. Examples of application 22 include rights authoring applications and systems, rendering applications of digital content such as multimedia, video, picture images, and musical artwork, and/or web-service execution systems, etc. For example, if the application 22 is a consumer of rights expressions such as a digital content and/or service rendering application, the application 22 can utilize various components of the extensible rights expression processing system 10 to perform various processing operations such as parsing, validating, or evaluating rights expressions.

Figure 2:
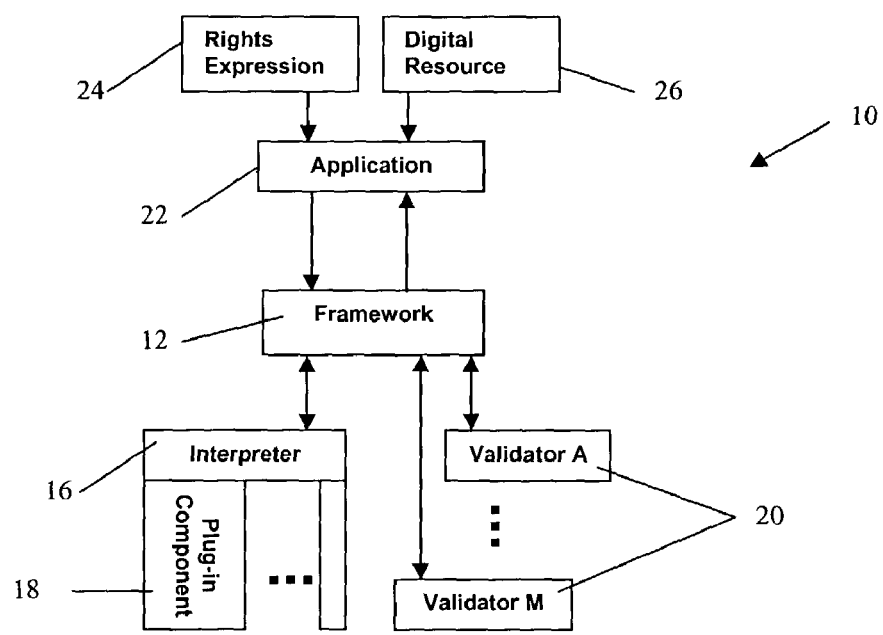
FIG. 2 is a block diagram of the extensible rights expression processing system of FIG. 1 in use.

FIG. 2 is a block diagram of the extensible rights expression processing system 10 of FIG. 1 which shows processing of a rights expression. The application 22 receives the rights expression 24 that is associated with the digital resource 26 and includes information regarding the digital resource 26. As previously noted, the rights expression 24 may include a grant that comprises a usage right associated with the digital resource 26 and a principal to whom the usage right is granted. Alternatively, the rights expression 24 may be, or also include, a request that comprises a usage right associated with digital resource 26 and a principal requesting use of the digital resource 26.

The application 22 passes the rights expression 24 with the information regarding the digital resource 26 to the framework 12. The framework 12 then locates the interpreter 16 that is capable of evaluating and/or authorizing the particular rights expression 24, and passes the rights expression 24 to the interpreter 16 for evaluation and/or authorization. The locating of the interpreter 16 that is capable of evaluating and/or authorizing the particular rights expression 24 may be implemented in various different ways. In one embodiment, when the interpreter 16 is provided to the rights expression processing system 10 via the framework 12, for instance, using the application 22, the interpreter 16 registers with the rights expression processing system 10, all the rights expressions of a specific namespace that may be evaluated and/or authorized by the interpreter 16. If the interpreter 16 is requested to evaluate and/or authorize a rights expression, the rights expression is looked up to determine if the rights expression was registered by the interpreter 16 which indicates that the interpreter 16 is capable of evaluating and/or authorizing the rights expression. If the rights expression has not been registered by the interpreter 16 thereby indicating that the interpreter cannot evaluate and/or authorize the rights expression, the interpreter 16 interacts with the framework 12 to locate a different interpreter that has registered the rights expression with the rights expression processing system 10, and passes the authorization request accordingly so that the rights expression can be evaluated and/or authorized. Of course, in other embodiments, other methods may be used to locate the appropriate interpreter for evaluating and/or authorizing rights expressions, and the above method is merely provided as one example.

The interpreter 16 evaluates the rights expression 24 using one or more plug-in subcomponents 18 which are configured to evaluate different types of rights expressions. As previously noted, the interpreter 16 provides an authorization result that may authorize the rights expression 24 without condition thereby indicating that the application 22 has a right to consume the digital resource 26 unencumbered. Alternatively, the interpreter 16 may conditionally authorize the rights expression 24 thereby indicating that the application 22 has a right to consume the digital resource 26 only upon the satisfaction of one or more conditions that are set forth in the rights expression 24. Moreover, the interpreter 16 may not authorize the rights expression 24 thereby indicating that the application 22 does not have the right to consume the digital resource 26. Of course, the result of the evaluation by the interpreter 16 is based on the grant and/or the request set forth in the rights expression 24.

In the example where the rights expression 24 includes both a grant and a request, the evaluation by the interpreter 16 is preferably attained by comparing the grant against the request. In particular, the usage right, the resource, and the principal set forth in the request are compared with the usage right, the resource, and the principal included in the grant. The interpreter 16 can then provide an authorization result based on this comparison. More specifically, the interpreter 16 authorizes the request if the usage right, the resource, and the principal of the request and the grant match one another. The interpreter 16 alternatively conditionally authorize the request if the usage right, the resource, and the principal of the request and the grant match one another, and the grant further includes one or more conditions. Alternatively, the interpreter 16 does not authorize the request if the usage right, the resource, and the principal of the request and the grant do not match one another.

If the interpreter 16 conditionally authorizes the rights expression 24, the validators 20 allow verification of the satisfaction of the conditions prior to allowing the consumption of the digital resource 26 identified in the rights expression 24. Each validator (validator A to validator M) is preferably configured to evaluate one or more specific types of conditions. Thus, the framework 12 searches and identifies the appropriate validator configured to verify the satisfaction of the condition set forth in the rights expression 24 prior to allowing the consumption of the digital resource 26. The search and identification of appropriate validators may be attained by a method of registering and looking up conditions in a manner similar to that of locating interpreters as described previously. Of course, other methods may alternatively be used as well.

As previously noted, the preferred embodiment of the rights expression processing system 10 has an extensible architecture with extensibility points and is capable of being extended to evaluate any present and future newly defined grammar-based rights expressions by implementing the various components of the rights expression processing system 10 as plug-in components. Thus, the interpreter 16 is implemented as a plug-in component having plug-in subcomponents 18 to allow additional interpreters and/or plug-in subcomponents to be added to allow evaluation of new rights expressions that are not initially supported by the rights expression processing system 10. In addition, the validators 20 are also implemented as plug-in components so that additional validators can be readily added to allow processing of new conditions. Thus, the rights expression processing system 10 is preferably readily expandable to process new rights expressions as they are developed in response to new rights granting paradigms and applications.

For example, Vendor A may launch a web-service intending to be the universal issuer and interpreter for rights vouchers, for example, licenses. One obvious challenge that Vendor A would be facing is that it is almost impossible to build such a universal system to accommodate all the possible rights granting paradigms at the time of the launch because further developments in technology and commerce will likely result in the need for new rights granting paradigms which will entail use of new rights expressions and/or new conditions. However, because the rights expression processing system 10 in accordance with the present embodiment is extensible in the manner described, Vendor A can build the rights expression processing system 10 using the interpreter 16, and validators 20 that process existing rights expressions. As the need for new rights expression and conditions associated thereto arises, Vendor A can build new components to process these new rights expressions. For example, new plug-in subcomponents for the interpreter 16, new interpreters, and/or new validators may be built and added to the rights expression processing system 10 to process the new rights expressions.

As previously noted, the interpreter 16 is a plug-in component that is adapted to allow evaluation and authorization of rights expression 24 thereby providing semantic meanings to rights expression 24. As an example, Appendix A shows an example license 50 for the rights expression 24. The license 50 grants a principal or other authorized person holding a valid key, the unlimited right to view, print, and copy the subject "eBook", for a flat fee of $25.99.

Referring again to FIGS. 1 and 2, the interactions between the interpreter 16, the framework 12, and the application 22 of the illustrated embodiment of the rights expression processing system 10 are as follows. Initially, the application 22 registers preferably trusted plug-in components with the framework 12 such as the interpreter 16, validator(s) 20, and any other supporting plug-in components. The application 22 then makes a programmatic call to the framework 12 to authorize the request of the rights expression 24. The framework 12 then searches for, and invokes, appropriate plug-in components that are capable of authorizing the request against the grants in the rights expression 24. In particular, the framework 12 identifies the appropriate interpreter 16 and validator 20 that are configured to evaluate and authorize the rights expression 24, for example, by using registration and look-up method as previously described.

The identified interpreter 16 performs various operations to evaluate the request against what is stated in the grant contained in the rights expression 24. The right, resource, and principal of the request are matched against the right, resource, and principal of the grant. The step of evaluating the grant may also include decrypting the grant if it is encrypted, verifying digital signature if it is signed, and/or authenticating the issuer of the grant. In addition, the step of evaluating the request may include authenticating that the principal is genuine, and verifying the resource. The interpreter 16 returns the authorization results to the application 22, indicating whether the request is authorized, conditionally authorized, or not authorized by the given rights expression 24.

If the interpreter conditionally authorizes the rights expression 24, the application 22 can then invoke the appropriate validator 20 through the framework 12 to validate the conditions required. This may be attained, for example, by having the application 22 provide context data required for validating the conditions set forth. Using the context data, the validator 20 validates compliance with the conditions set forth in the rights expression 24. If the appropriate context data is not provided, then the conditions may be deem to be not satisfied. Of course, the above described method is merely one example of how the validator 20 can validate compliance with the conditions of the rights expression 24 and in other embodiments, other methods may be used.

In the rights expression 24 example set forth in the license 50 of Appendix A, the fee element is a condition associated with all of the rights included in the grant to view, print, and copy the eBook. The fee condition states that the application 22 should only be allowed to exercise the rights if, and only if, a fee of $25.99 has been paid. As shown in the example, the validator 20 accesses a payment record service that provides the required context data to validate that this condition has been satisfied.

Of course, it should be noted that multiple conditions may be set forth in the rights expression which requires multiple validations. In this regard, plurality of validators 20 can validate these multiple conditions set forth in the rights expressions that represent conditions. The framework 12 manages the validators 20, and invokes them one by one based on, for example, the following validation rules:

```
For every condition on the conditions list
    For every validator on the validators list
        Perform condition validation
        If condition is valid, skip to the next by exiting the inner for-loop
        If condition is invalid, then skip to the next validator
    End-for (validators list)
End-for (conditions list)
If all conditions are valid, exit validation process and return a success status
Else exit validation process and return a failure status.
```

Of course, the above validation rules are merely one example and other rules may be used instead.

Figure 3:
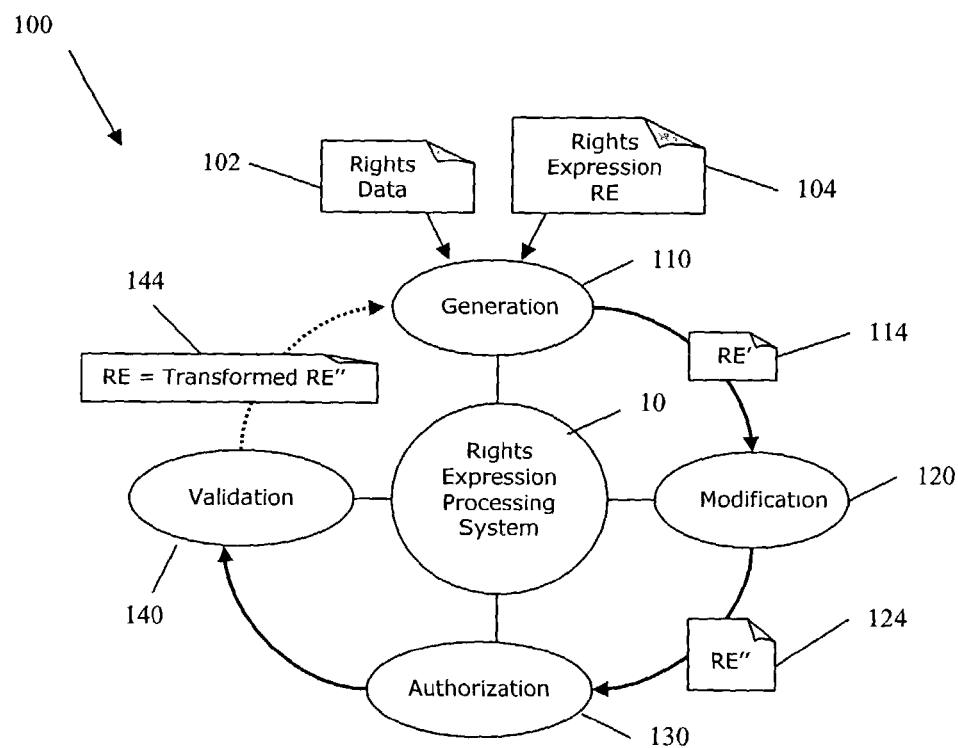
FIG. 3 is a schematic illustration of a rights expression lifecycle in accordance with one embodiment of the present invention.

FIG. 3 illustrates a rights expression lifecycle 100 in accordance with one aspect of the present invention. As shown, the rights expression lifecycle 100 includes four basic process stages: generation 110, modification 120, authorization 130, and validation 140. Each of these process stages are performed in this sequence to ensure proper processing of enforceable rights expression 104 in accordance with the illustrated preferred embodiment. Of course, in other embodiments however, the sequence and/or the lifecycle itself may be altered.

As shown in FIG. 3, rights data 102 and/or rights expression RE 104 are taken as inputs in the generation process stage 110 and are processed, the processed rights expression RE being indicated by added prime designations as it is processed. In particular, rights expression RE' 114 is created as an output of the generation process stage 110. Rights expression RE' 114 is then input into the modification process stage 120 which transforms rights expression RE' 114 into RE" 124. It should be noted that rights expressions RE, RE', and RE" need not be different, but in certain cases, may be the same if the rights expression need not be altered during one or more of the process stages.

In the authorization process stage 130, the rights expression RE" 124 and any supplementary information are received, and the exercising rights described in the rights expression RE' 124 is evaluated and authorized, for example, in the manner described above relative to FIGS. 1 and 2. Following authorization process stage 130 is the validation process stage 140 in which authorized rights expression RE'', or a subset thereof, are validated, for example, in the manner described above relative to FIGS. 1 and 2 to validate compliance with any conditions set forth therein. Thus, by the end of the various process stages of the rights expression lifecycle 100, the rights expression RE 104 has been transformed in to rights expression RE" 124 and may be again used with new rights data 102 in step 144.

It should be evident that each of the above described process stages have their own means for extensibility. In this regard, to facilitate illustration and understanding of each process stage clearly, the above example of an "eBook" is used to clarify how each process stage effect the rights expressions, and allow extensibility without the need to modify the core rights expression processing system. For example, a publisher of the eBook may wish to allow anyone holding a valid key that was issued by someone the publisher trusts, the unlimited right to view, print and copy the contents of the eBook, as long as they pay a flat fee of $25.99. While rights expressions as may be expressed using a variety of RELs, one REL may be XrML™. As noted previously, an enforceable set of rights of a license XrML™ can be found in the rights expression 24 as set forth in the license 50 of Appendix A. However, as previously noted, the term "rights expression" as used herein refers to any rights expression including fragments of licenses that are not enforceable by itself and should not be interpreted to mean enforceable licenses.

Figure 4:
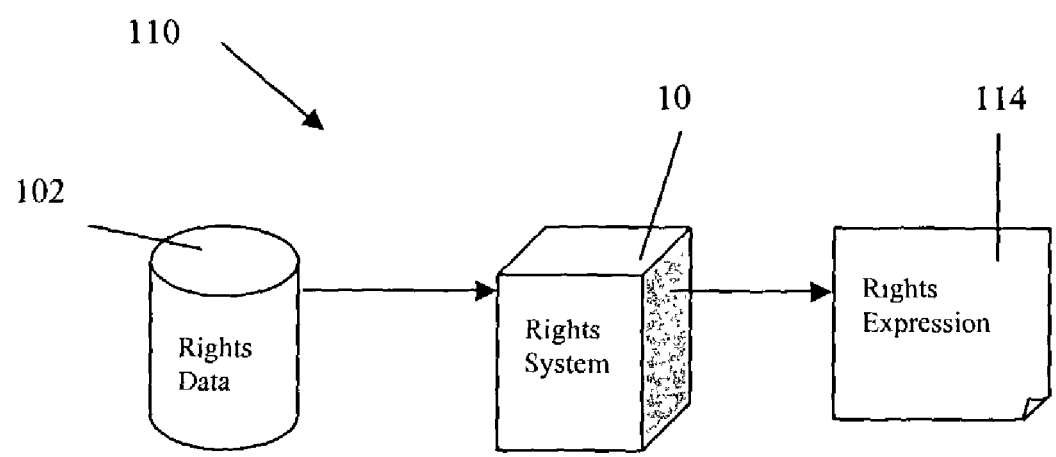
FIG. 4 is a schematic illustration of the rights expression generation process stage in the rights expression lifecycle of FIG. 3.

In order to generate the rights expression for the example eBook in the generation process stage 110, various pieces of information should be made available. For instance, the name of the eBook, the key that identifies the principal(s) wishing to use the eBook, and information regarding the payment service that will process the flat fee of $25.99 for use of the eBook should be made available. In FIGS. 3 and 4, this information is represented as rights data 102, FIG. 4 showing a schematic diagram of the rights expression generation process stage 110 in the rights expression lifecycle 100 of FIG. 3. In particular, the rights data 102 is used by the rights expression processing system 10 to generate the rights expression 114. This rights data 102 may convey this information in either a human or machine readable format.

Note that the rights expression 104 may or may not be enforceable at this stage of the lifecycle 100. In this regard, the rights expression 104 may simply be a fragment of rights that can be merged with additional data in the next stage, i.e. the modification process stage 120, which together form a rights expression having enforceable rights. It is also possible that the rights data 102 is manipulated into rights expressions 104 manually, for instance, by someone coding the rights expression directly. Whether this process takes place in an automated or manual process, the end result is the generation of rights expression RE' 114, which may be represented in any language or syntax.

The extensibility of the generation process stage 110 allows addition of rights expressions or manipulation of existing rights expressions without the need to change the core rights expression processing system 10 in any way. As previously noted, one example REL which allows this extensibility is the XrML™ rights expression language based on the W3C XML Schema standard. This standard allows the core schema which defines the language, to remain unchanged, while still allowing external schema references to utilize and expand the language.

Referring again to the example, if the publisher that offered the eBook wanted to charge the same $25.99 for its use, but was required by law to charge the applicable sales tax for its sale, the publisher, or someone on behalf of the publisher, may add a new rights expression named "tax". This new rights expression would be added into their own schema, referencing the XrML™ core schema as a base. This allows the use all the rights expressions of XrML™ schema along with their new rights expression. The ability to allow manipulation of the rights expressions is most clearly illustrated in FIG. 5 which shows a schematic diagram 200 in which a new custom rights expression 204 is combined with a core rights expression 202. The new custom rights expression 204 recites <sx:tax>0.0825</sx:tax> setting forth the rate of tax to be applied. The core rights expression 202 sets forth the fee for the eBook. The combining of the core rights expressions 202 and the custom rights expressions 204 results in the generation of the combined rights expression 206 in which the fee and the tax is set forth. In the described manner, the rights expression processing system 10 of the present invention can be extended to generate this new combined rights expression 206.

This extensible capability is made possible by the abstraction of the parser 14 and the other components of the rights expression processing system 10. As shown in FIG. 1, the parser 14 is separated from other components of the rights expression processing system 10 by the framework 12. Each component thus communicates with the parser 14 through the framework 12 so that, preferably, direct communication between the various components is not allowed. This allows for a standardized interface, allowing additional components such as the plug-in subcomponents 18 and/or the validators 20 to be added to the rights expression processing system 10 as previously described. Each newly added component could perform its intended action as long as it communicates with the framework 12 in performing its actions.

Figure 5:
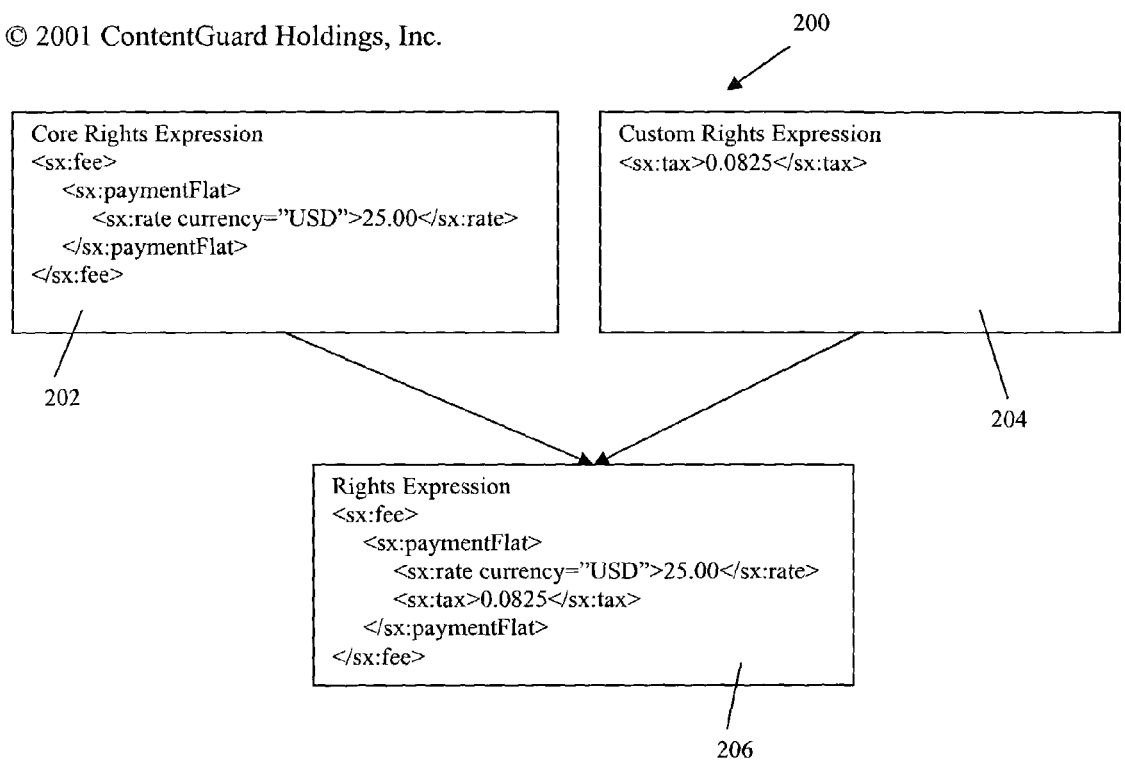
FIG. 5 is a schematic diagram illustrating the generation of a rights expression using rights expressions as inputs.

Referring to the schematic diagram 200 of FIG. 5, a new component such as an interpreter 16 with plug-in subcomponents 18 and/or a validator 20 can be added to the rights expression processing system 10 that understands the tax expression provided in the rights expressions 204, and would work with the parser 14 via the framework 12, to evaluate and/or validate the combined rights expression 206 that incorporates the new "tax" element. The parser 14 would simply query the framework 12 if it knew of a component in the rights expression processing system 10 that can evaluate and/or validate the "tax" element of the rights expression 204. The framework 12 would then locate the required component(s) and ask the component(s) to perform some action such as validating the syntax or any associated data that accompanies it. To the extent that components of the rights expression processing system 10 do not have the capability to process the new "tax" element, components configured to process the new "tax" element can be provided to the rights expression processing system 10. With the new components, the rights expression 206 may be properly processed by the rights expression processing system 10. In this manner, the rights expression processing system 10 is truly extensible to handle proper rights expressions.

Referring again to FIG. 3, the modification process stage 120 of the lifecycle 100 entails taking existing rights expressions in some form, and modifying them in some way to produce a new and/or enforceable set of rights expressions. This is a very desirable feature as will be evident from the description of one example application herein. Referring again to the example of the eBook, the publisher of the eBook will likely prefer to avoid having to generate a new set of rights expressions for each and every customer. This would be not only time consuming, but tedious as well. One possible solution and an area of extensibility within the modification process stage 120, is for the publisher to generate rights expressions during the generation process stage 110, but leave out the important data that distinguishes one set of enforceable rights from another. Such important data may be, for example, the key that identifies the principal(s) authorized to use the eBook. The location in the rights expressions where the principal is designated could contain a placeholder or a "token" that would allow data to be merged with the rights expressions, resulting in enforceable rights expressions.

Figure 6:
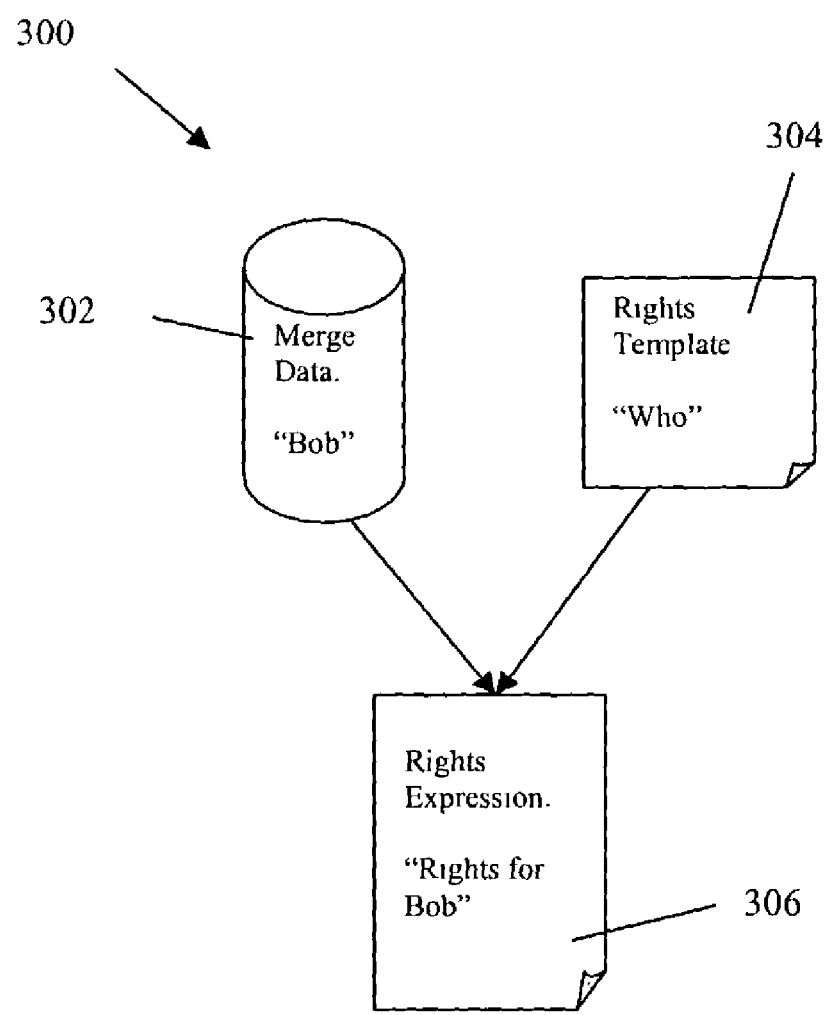
FIG. 6 is a schematic illustration of the rights expression modification process stage in the rights expression lifecycle of FIG. 3.

In particular, FIG. 6 shows a schematic diagram 300 illustration of one example of the rights expression modification process stage 120 in the rights expression lifecycle 100 of FIG. 3. In the illustrated example, the merge data 302 may be the key which identifies "Bob" as the principal, i.e. a person authorized to use the eBook. This key is merged with the incomplete rights expression, i.e. a rights template 304, resulting in a complete set of enforceable rights 306 for Bob. For example, using XrML™, the incomplete rights expressions of the rights template 304 may be set forth in the manner below prior to the data merge during the rights expression modification process 102:

```
<keyHolder>
    <dsig:keyValue>
        <dsig:RSAKeyValue>
            <cgXrML:CGTOKEN TOKENNAME="<tokenName>" />
        </dsig:RSAKeyValue>
    </dsig:keyValue>
</keyHolder>
```

Once the key data has been merged with the rights template 304, the resulting enforceable rights 306 may resemble:

```
<keyHolder>
    <dsig:keyvalue>
        <dsig:RSAKeyValue>
            <dsig:Modulus>
Idvypjad7XoaYhu9tXAYXaENf8li0VvWHBXvs5nGlySw7exuDOv2olqnNapHtz9OviupZRQ/nEa1i
+ 6TSRuGsw==
            </dsig:Modulus>
        </dsig:RSAKeyValue>
    </dsig:keyValue>
</keyHolder>
```

Figure 7:
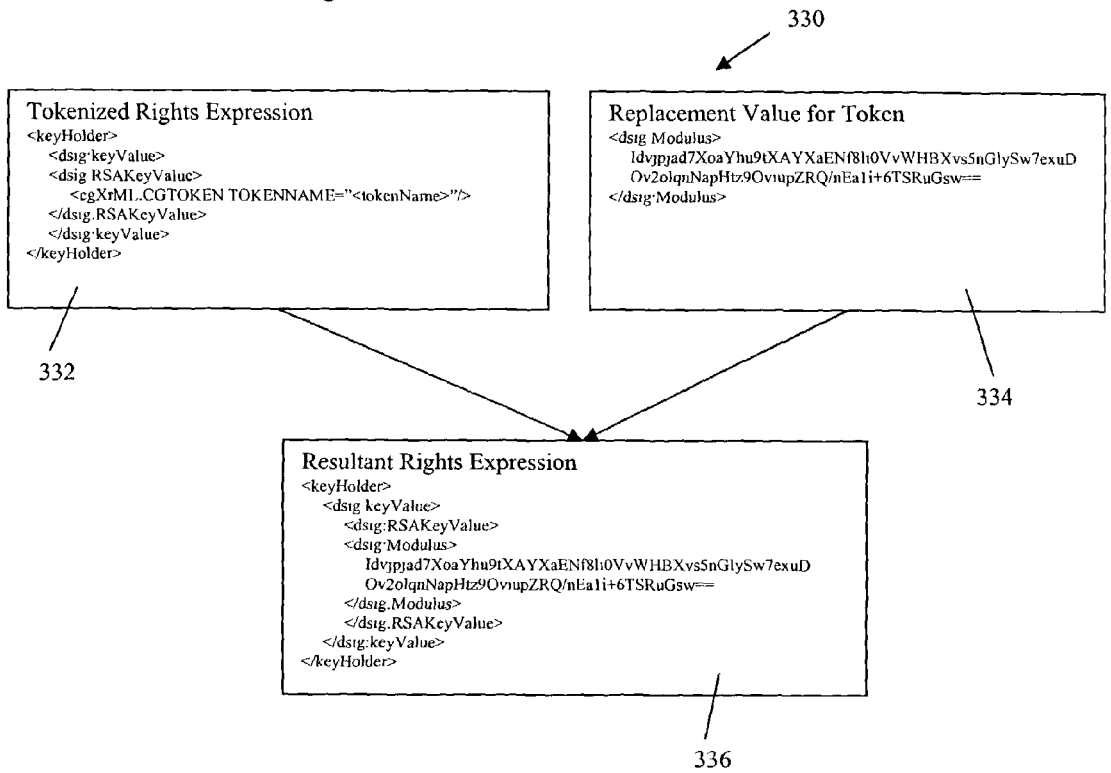
FIG. 7 is a schematic diagram illustrating the modification of a rights expression during the rights expression modification process stage.

FIG. 7 shows a schematic diagram 330 illustrating another example method for modifying a rights expression during the rights expression modification process stage 120 of the rights expression lifecycle 100. In particular, the schematic diagram 330 shows a tokenized rights expression 332 which contains a token that allows data to be merged into the tokenized rights expression 332. In the present example, the line that appears in the tokenized rights expression 332 that reads "<cgXrML:CGTOKEN TOKENNAME="<tokenName>" />" indicates that entire line is to be replaced with some real data before an enforceable set of rights can be formed. The replacement value for the token in the tokenized rights expression 332 is provided in the replacement value expression 334 which substitutes for the token in the tokenized rights expression 332. This results in the resultant rights expression 336 which is an enforceable set of rights in the present example.

In other embodiments, another way that rights expressions may be modified during the modification process stage 120 is by applying digital signature requirements. Digital signatures are often used to ensure that the contents have not been tampered with. The signature can be used to not only identify the person who signed it, but also to ensure the integrity of the data within. Digital signatures are often a vital part of any Rights Management system, but are not mandatory and use of digital signatures (e.g. W3C's DSIG standard) depends on the level of security needed for the system application. Of course, a rights expression may be modified to require such digital signatures to ensure that the contents of the rights expressions have not been tampered with.

The authorization process stage 130 is the most complex process stage in the rights expression lifecycle 100 of FIG. 3, and in one embodiment described herein, entails matching a request to exercise certain usage rights with a set of enforceable rights prescribed in given grant or grants. The authorization process stage 130 in accordance with the present embodiment encompasses various sub-processes which may include grant validation, grant resolution, and grant matching.

Figure 8:
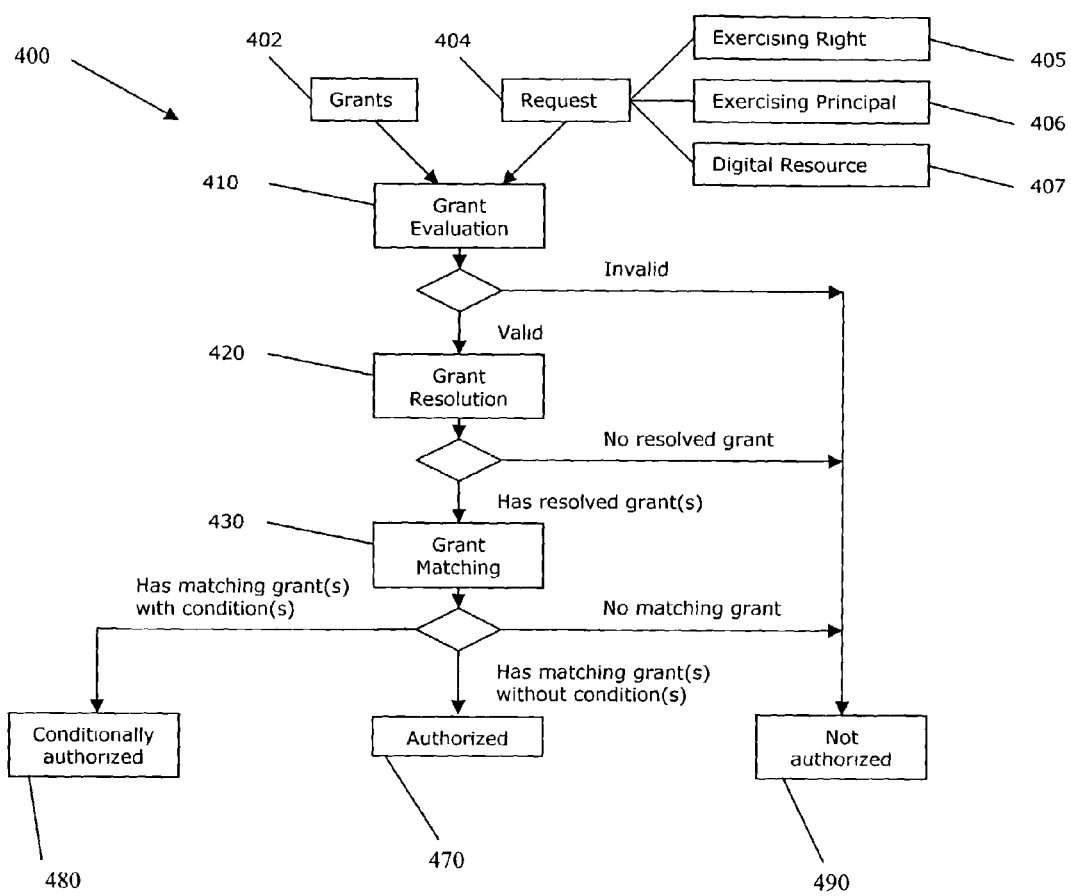
FIG. 8 is a flow diagram of a rights expression authorization process stage in the rights expression lifecycle of FIG. 3.
Figure 9:
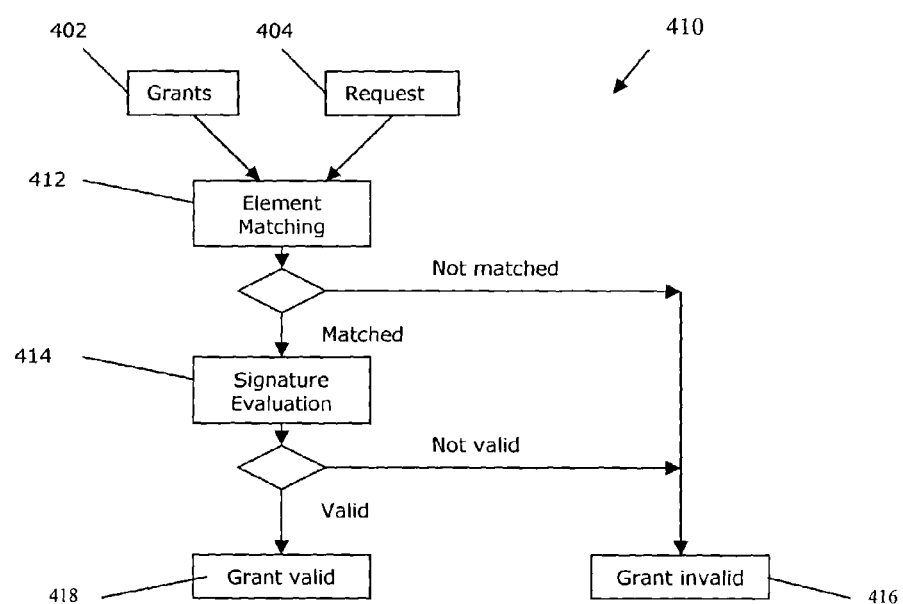
FIG. 9 is a flow diagram illustrating the grant validation sub-process in the authorization process stage of the rights expression lifecycle of FIG. 3.
Figure 10:
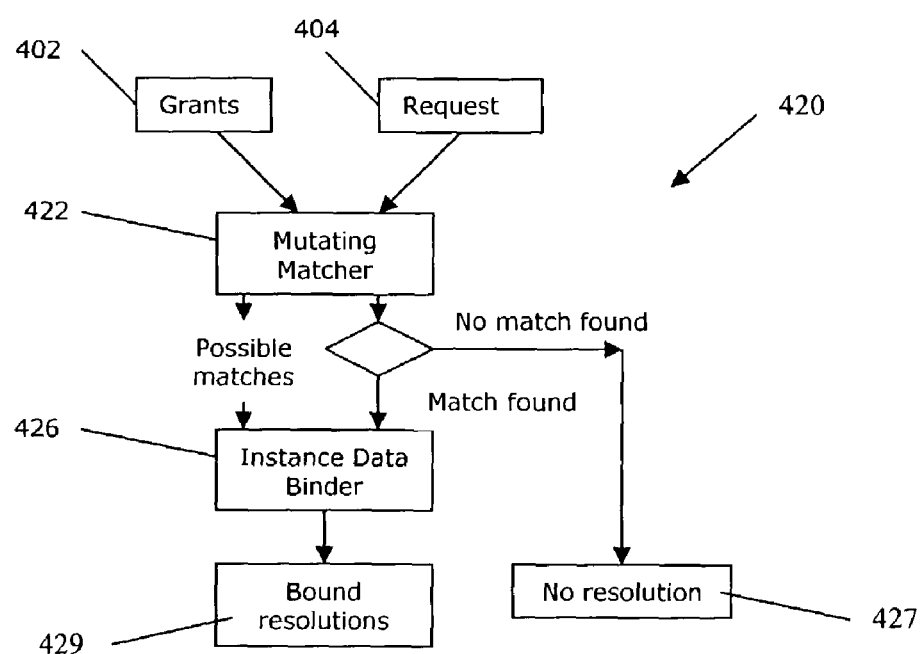
FIG. 10 is a flow diagram illustrating the grant resolution sub-process in the authorization process stage of the rights expression lifecycle of FIG. 3.

FIG. 8 shows a schematic flow chart 400 illustrating an example rights expression authorization process stage 130 in the rights expression lifecycle 100 in accordance with one embodiment. As shown, in flow chart 400, enforceable grants 402 and requests 404 are used in the authorization process stage 130. The requests 404 may include information regarding exercising right 405 desired, identification of an exercising principal 406, and a digital resource 407. The authorization process stage 130 of the present embodiment includes grant evaluation 410, grant resolution 420, and grant matching 430 sub-processes, each of which are described in further detail below. The authorization process stage 130 results in the request 404 being authorized 470, conditionally authorized 480, or not authorized 490. Of course, it should be appreciated that the rights expression authorization process stage 130 and the sub-processes as described herein are merely examples and the processes may be altered or otherwise modified. For example, the sub-processes of the authorization process stage 130 may be altered to have different process sequence and steps than as shown in FIGS. 8 to 10 described in detail below. Moreover, each of the sub-processes are also examples only and may be altered to have a different process sequence and steps than as shown. Consequently, the present invention should not be construed to be limited to the examples shown.

The sub-process of grant evaluation 410 performs a series of tasks to verify critical elements of the grant 402 including, but not limited to, digital signatures, issuer principal(s), digital resources, and exercising right. The sub-process of grant evaluation 410 may be performed by a replaceable component so that rights expressions with new syntaxes and/or semantics could be evaluated. FIG. 9 is a schematic diagram illustrating the grant evaluation sub-process 410 in accordance with one example embodiment in the authorization process stage 130 of the rights expression lifecycle 100 of FIG. 3.

In the illustrated example embodiment, grants 402 and a request 404 are evaluated in an element matching step 412 in order to match various elements of the request 404 with the grants 402. In other words, in the element matching step 412, matching elements for various elements such as the right, digital resources, digital identities (such as key identifying the principal) set forth in the request 404 are sought for in the grants 402. If the elements do not match, the grants 402 is deemed invalid in step 416. In the above regard, the rights expression processing system 10 of the present invention is preferably adapted to use plug-ins capable of performing a variety of comparisons to achieve extensibility. Since the element matching step 450 and the supporting sub-components that provide this functionality are implemented as plug-ins, new matching functions could be designed and implemented to support matching of new elements.

If the elements do match in the element matching step 412, the signature evaluation step 414 is conducted in the present example in which the digital signature of the grants 402 are evaluated to verify that the grant's integrity is intact. This signature evaluation step 414 may also be performed by using a plug-in component. Such a plug-in component may be adapted to also deploy pluggable components to perform digital signature evaluation and verification functions such as crypto and message digest to maximize extensibility support. If the signature cannot be verified, the grant 402 is deemed invalid in step 416, and in turn, the request is not authorized in step 490 of authorization step 103 as shown in FIG. 3. If the signature can be verified, then the grant 402 is deemed valid in step 418 in the present example.

Figure 11:
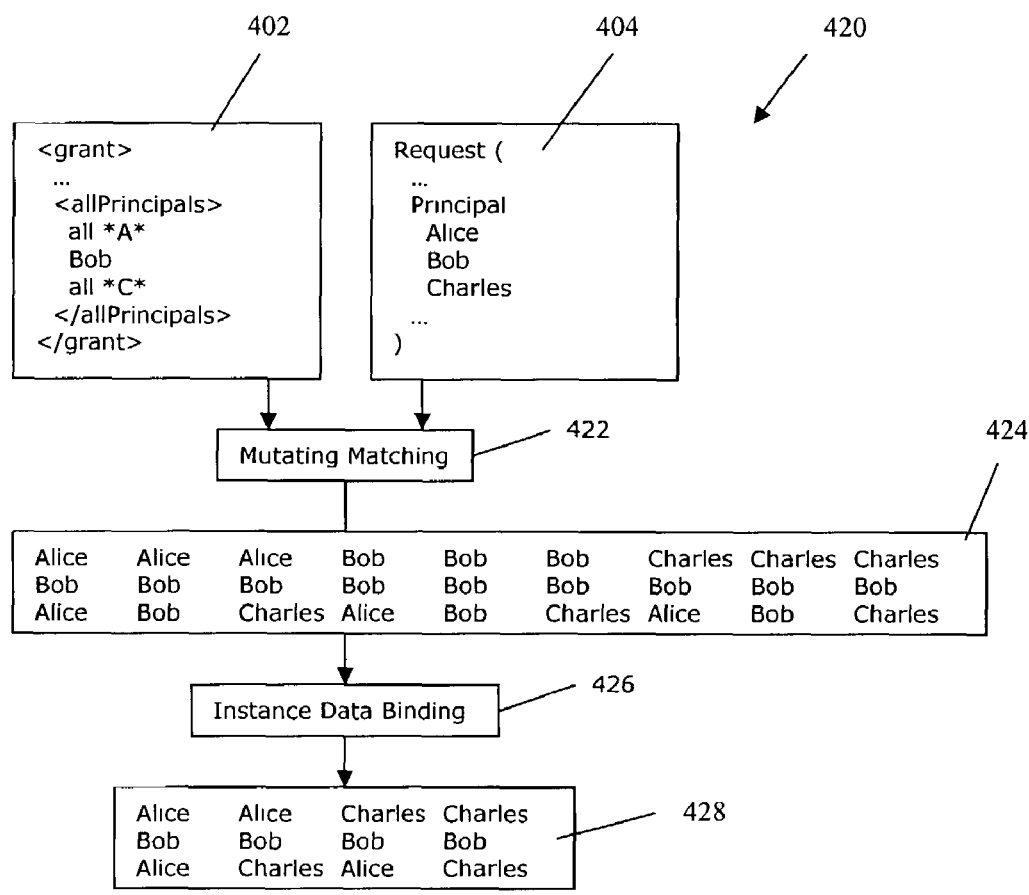
FIG. 11 is a schematic diagram illustrating the grant resolution sub-process of FIG. 10 using example data.
Figure 12:
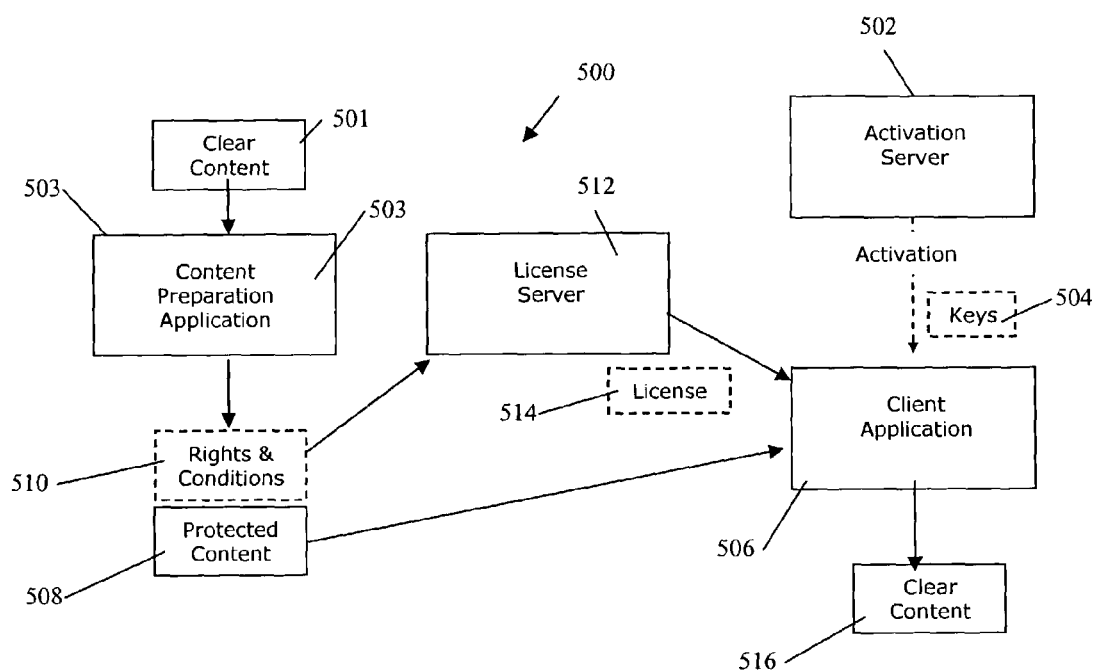
FIG. 12 is a schematic illustration of a Rights Management system.

Referring again to FIG. 8, once the grants 402 are deemed valid in step 418, the sub-process of grant resolution 420 is executed in the present example to ensure that all possible elements of the request 404 are matched with the elements of the grants 402. The steps involved in the sub-process of grant resolution 420 of an example embodiment are shown in FIGS. 10 and 11. Referring to FIG. 10, the sub-process of grant resolution 420 includes mutating and matching step 422 in which all permutations of the elements are considered. Further details of the mutating and matching step 422 in accordance with one example are shown in FIG. 11 in which the elements of the grants 402 and the request 404 are shown. Referring to FIGS. 3, 10, and 11, the elements of the requests 404 are expanded during the mutating and matching step 422 so that variations and mutations thereof, are provided in the element set 424. If no match is found, no resolution is provided in step 427, and in turn, the request 404 is not authorized in step 490 of authorization process stage 130 of the rights expression lifecycle 100. If possible matches are found, the instance data binding step 426 is carried out as described below.

In the instance data binding step 426 of the present example, the variations and mutations of the elements of the request 404 set forth as the element set 424 which may match one or more elements in grants 402 are bound based on the instance data and set apart in the matched and bound element set 428. As shown in the example embodiment of FIG. 11, the grant 402 may contain elements where the granted principal is listed as including anyone having the letter 'A' in its identity, followed by anyone identified as "Bob," followed by anyone has the letter 'C' in its identity. The request 404 may contain the exercising principal as the list "Alice", followed by "Bob", followed by "Charles." The resultant permutations of the elements in the request 404 that allow possible matching are shown in element set 424. It should be noted that the element set 424 is not the set of all possible permutations of Alice, Bob, and Charles. Rather, the element set 424 contains only the possible matches with Bob being in the second position, since Bob is not a variable element and must be provided at the second position as set forth in the grant 402. In the present example, during the instance data binding step 426, each possible match as set forth in the element set 424 are evaluated against the rights expressions "all A", "Bob", and "all C" as set forth in the grant 402 to generate the matched and bound set 428 which is indicated as being bound resolutions 429.

It should be noted that the example sub-process of grant resolution 420 described does not necessarily require that the elements of the grants 402 have variables that need be resolved for authorization. The sub-process of grant resolution 420 may also be applied to grants that do not require variable resolution as well. It should also be noted that in the preferred embodiment, the component used to perform the above described sub-processes of mutating and matching 422, as well as instance data binding 426, are preferably implemented as plug-in components that can be replaced or added to support new rights expression extensions.

Referring again to the example embodiment of FIG. 8, the sub-process of grant matching 430 is then executed which involves matching each element of the matched and bound set 428 against the evaluated, i.e. bound and completely resolved grant(s) that are derived from the grants 402. A grant is said to be bound and completely resolved when all of the variables and expressions have been instantiated and evaluated with data from the grants 402. If there are no matching elements between the grants 402 and the elements of the matched and bound set 428, then the request is not authorized in step 490 of authorization step 103 of the rights expression lifecycle 100 shown in FIG. 3. Of course, the results from the grant matching 430 sub-process may include one or more elements that perfectly match the elements of the grant 402. In such an instance, the request is authorized accordingly. For example, if the matching elements of the request 404 and the grants 402 do not provide any conditions, authorization is issued without conditions as shown in step 470. However, if the grants 402 do provide conditions, a conditional authorization is made as shown in step 480.

Again, it should be kept in mind that the above described processes of FIG. 8 and sub-processes of FIGS. 9 and 10 are merely provided as examples only and may be modified or otherwise altered in other embodiments to have different process sequences and steps than as shown and described. For example, in the authorization process stage 130, the grant evaluation 410 sub-process having the signature evaluation step 414 may be performed anytime during the authorization process stage 130, e.g. before or after grant resolution 420 sub-process and/or grant matching 430 sub-process. Of course, other modifications to the processes and sub-processes may be made as well in other embodiments.

Referring again to FIG. 3, the validation process stage 104 of the rights expression lifecycle 100 requires the validator 20 to verify the satisfaction of the conditions set forth in the rights expression 104 prior to allowing the consumption of the digital resources identified in the rights expression 104 as previously described relative to FIGS. 1 and 2. Thus, referring to the eBook example of the XrML™ license 50 set forth in Appendix A, the condition rights expressions placed on the use of the eBook are the verification of the user's digital key, and the payment of $25.99. Both of these conditions have to be validated before the associated rights may be granted to the user. The section of the XrML™ license 50 of Appendix A that defines the required payment is as follows:

```
<sx:fee>
    <sx:paymentFlat>
        <sx:rate currency="USD">25.99</sx:rate>
        <sx:paymentRecord>
            <sx:stateReference>
                <uddi>
                    <serviceKey>
                        <uuid>D04951E4-332C-4693-B7DB-D3D1D1C20844</uuid>
                    </serviceKey>
                </uddi>
            </sx:stateReference>
        </sx:paymentRecord>
    </sx:paymentFlat>
</sx:fee>
```

In this example, the validator 20 processes the $25.99 fee during the validation process stage 140 with a preferred payment service, using the identifier "D04951E4-332C-4693-B7DB-D3D1D1C20844" as designated with the serviceKey sub-element. Once the payment has been authorized, the validator 20 returns a positive result thereby indicating compliance with this condition of the grant. Once all of the other conditions have been validated by the validator 20 in a similar manner, the associated rights set forth in the grant are granted to the user. In this example license 50 set forth in Appendix A, the rights are as follows:

```
<!-- The right to play (view) is granted-->
    <grant>
        <cx:digitalWork>
            <cx:locator>
                <cx:nonSecureIndirect URI="http://www.contentguard.com/samples/eBook" Type="URL" />
            </cx:locator>
        </cx: digitalWork >
        <cx:play/>
    </grant>
<!--The right to print is granted-->
    <grant>
        <cx: digitalWork >
            <cx:locator>
                <cx:nonSecureIndirect URI="http://www.contentguard.com/samples/eBook" Type="URL" />
            </cx:locator>
```

-continued

```
        </cx: digitalWork >
        <cx:print/>
    </grant>
<!--The right to copy is granted-->
    <grant>
        <cx: digitalWork >
            <cx:locator>
                <cx:nonSecureIndirect URI="http://www.contentguard.com/samples/eBook" Type="URL" />
            </cx:locator>
        </cx: digitalWork >
        <cx:copy/>
    </grant>
</grantGroup>
```

It should now be apparent in view of the discussion above, that the rights expression processing system in accordance with one embodiment of the present invention provides a novel and advantageous system that may be used to generate, modify, authorize, and validate grammar based rights expressions. As explained, the rights expression processing system may be implemented with an extensible architecture having extensibility points to allow new syntaxes to be added without changing semantics or grammars of rights expressions to thereby allow accommodation of new rights expressions. This extensibility is preferably realized by implementing the components of the rights expression processing system such as the interpreter and validator as plug-in components.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications as defined by the appended claims and legal equivalents.

APPENDIX A

An example rights expression that grants to a principal or other authorized person the unlimited right to view, print, and copy the subject "eBook," for a flat fee of $25.99:

```
<license>                                          50
    <grant>
        <grantGroup>
            <dsig:keyValue>
                <dsig:RSAKeyValue>
                    <dsig:Modulus>
Idvymad7XoaYhu9tXAYXaENf8li0VvWHBXvs5nGlySw7exuDOv2olqnNapHtz9OviupZRQ/nEali+
6TSRuGsw==
                    </dsig:Modulus>
                </dsig:RSAKeyValue>
            </dsig:keyValue>
        </keyHolder>
        <!--The right to play (view) is granted-->
        <grant>
            <cx:digitalWork>
                <cx:locator>
                    <ex:nonSecureIndireet URI="http //www.contentguard.com/samples/eBook" Type="URL" />
                </cx:locator>
            </cx: digitalWork>
            <ex:play>
        </grant>
        <!--The nght to print is granted-->
        <grant>
            <cx:digitalWork>
                <cx:locator>
                    <ex:nonSecurelndirect URI="http://www.contentguard.com/samples/eBook" Type="URL" />
                </cx:locator>
            </cx: digitalWork>
            <ex:print>
        </grant>
        <!--The right to copy is granted-->
        <grant>
            <cx: digitalWork>
                <cx:locator>
                    <cx:nonSecureIndirect URI="http://www.contentguard.com/samples/eBook" Type="URL" />
                </cx:locator>
            </cx: digitalWork>
            <cx:copy>
        </grant>
        </grantGroup>
        <sx:fee>
            <sx paymentFlat>
                <sx:rate currency="USD" >25.99</sx:rate>
                <sx.paymentRecord>
                    <sx:stateReference>
```

APPENDIX A-continued

An example rights expression that grants to a principal or other authorized person the unlimited right to view, print, and copy the subject "eBook," for a flat fee of $25.99:

```
            <uddi>
                <serviceKey>
                    <uuid>D04951E4-332C-4693-B7DB-D3D1D1C20844</uuid>
                </serviceKey>
            </uddi>
          </sx:stateReference>
        </sx:paymentRecord>
      </sx:paymentFlat>
    </sx:fee>
  </grant>
```

We claim:

1. An extensible grammar-based rights expression system for processing a plurality of extensible rights expressions, said system comprising:

at least one extensible interpreter configured to evaluate said plurality of extensible rights expressions;

at least one extensible validator configured to validate compliance with respective conditions set forth in said plurality of rights expressions upon authorization by said interpreter; and an extensible framework configured to provide an interface between said at least one interpreter and said at least one validator, said framework comprising means for registering configuration information of plural interpreters and plural validators and means for invoking an appropriate interpreter and an appropriate validator based on a programmatic call from an application and the registered configuration information.

2. The system of claim 1, wherein said rights expressions include a grant that includes a usage right associated with a resource and a principal to whom said usage right is granted.

3. The system of claim 2, wherein said rights expressions include a request that includes a usage right associated with a resource and a principal requesting use of said resource.

4. The system of claim 3, wherein said interpreter is configured to evaluate said request based on said grant, and at least one of:

authorize said request if said requested usage right is issued in said grant;

conditionally authorize said request if said requested usage right is issued with one or more condition set forth in said grant; and not authorize said request if said requested usage right is not issued in said grant.

5. The system of claim 4, wherein said request is conditionally authorized so that said usage right requested in said request is authorized contingent on one or more condition set forth in said grant.

6. The system of claim 5, wherein one of said validator validates compliance with said one or more condition set forth in said grant.

7. The system of claim 3, wherein said interpreter is configured to evaluate said rights expressions based on said request and said grant.

8. The system of claim 7, wherein said rights expressions are evaluated by said interpreter by comparing said usage right, said resource, and said principal included in said request with said usage right, said resource, and said principal included in said grant.

9. The system of claim 8, wherein said interpreter is configured to at least one of:

authorize said request if said usage right, said resource, and said principal of said request and said grant match one another;

conditionally authorize said request if said usage right, said resource, and said principal of said request and said grant match one another, and said grant further includes one or more conditions; and not authorize said request if said usage right, said resource, and said principal of said request and said grant do not match one another.

10. The system of claim 2, wherein said interpreter is configured to evaluate said grant by at least one of decrypting said grant, verifying a digital signature, and authenticating an issuer of said grant.

11. The system of claim 3, wherein said interpreter is configured to evaluate said request by at least one of authenticating said principal, and verifying said resource.

12. The system of claim 1, further comprising an application that interfaces with said framework to provide said rights expressions to said interpreter.

13. The system of claim 12, wherein said application is at least one of a creator, a distributor, and a consumer of said rights expressions.

14. The system of claim 12, wherein said application is at least one of a rights authoring system configured to author digital content, and a rendering system configured to render digital content.

15. The system of claim 1, further comprising a parser configured to manipulate said rights expressions.

16. The system of claim 15, wherein said parser is further configured to facilitate processing of new rights expressions.

17. The system of claim 15, wherein said parser interfaces with said framework to provide said manipulated rights expressions to said interpreter.

18. The system of claim 1, wherein said interpreter is configured to be expanded by adding additional plug-in subcomponents thereto.

19. The system of claim 18, wherein said additional plug-in subcomponents are configured to allow evaluation of new rights expressions.

20. The system of claim 18, further comprising additional validators configured to validate compliance with conditions set forth in said new rights expressions.

21. The system of claim 1, further comprising additional validators configured to validate compliance with conditions set forth in new rights expressions.

22. The system of claim 1, wherein the framework is configured to register the interpreter and the validators into the framework, identify the interpreter and the validators corresponding to the rights expressions that the interpreter and the validators can process, look up the identified interpreter and validators, and invoke the identified interpreter and validators.

23. The system of claim 1, wherein said system is implemented with one or more hardware and software components.

24. A method for processing rights expressions used in an extensible grammar-based rights expression system, said method comprising:
registering configuration information of plural interpreters and plural validators with a framework;
invoking an appropriate interpreter and an appropriate validator based on a programmatic call from an application and the registered configuration information;
evaluating, via the invoked interpreter, said rights expression; and
validating, via the invoked validator, compliance with respective conditions set forth in said rights expression upon authorization by said interpreter.

25. The method of claim 24, wherein said rights expressions include a grant that includes a usage right associated with a resource and a principal to whom said usage right is granted.

26. The method of claim 25, wherein said rights expressions include a request that includes a usage right associated with a resource and a principal requesting use of said resource.

27. The method of claim 26, wherein said interpreter is configured to evaluate said request based on said grant, and at least one of:
authorize said request if said requested usage right is issued in said grant;
conditionally authorize said request if said requested usage right is issued with one or more condition set forth in said grant; and
not authorize said request if said requested usage right is not issued in said grant.

28. The method of claim 27, wherein said request is conditionally authorized so that said usage right requested in said request is authorized contingent on one or more condition set forth in said grant.

29. The method of claim 28, further comprising validating, via said invoked validator, compliance with said one or more condition set forth in said grant.

30. The method of claim 26, further comprising evaluating, via said invoked interpreter, said rights expressions based on said request and said grant.

31. The method of claim 30, further comprising evaluating, via said invoked interpreter, said rights expressions by comparing said usage right, said resource, and said principal included in said request with said usage right, said resource, and said principal included in said grant.

32. The method of claim 31, further comprising, via said invoked interpreter, at least one of:
authorizing said request if said usage right, said resource, and said principal of said request and said grant match one another;
conditionally authorizing said request if said usage right, said resource, and said principal of said request and said grant match one another, and said grant further includes one or more conditions; and
not authorizing said request if said usage right, said resource, and said principal of said request and said grant do not match one another.

33. The method of claim 25, further comprising evaluating, via said invoked interpreter, said grant by at least one of decrypting said grant, verifying a digital signature, and authenticating an issuer of said grant.

34. The method of claim 26, further comprising evaluating, via said invoked interpreter, said request by at least one of authenticating said principal, and verifying said resource.

35. The method of claim 24, further comprising interfacing an application with said framework to provide said rights expressions to said interpreter.

36. The method of claim 35, wherein said application is at least one of a creator, a distributor, and a consumer of said rights expressions.

37. The method of claim 35, wherein said application is at least one of a rights authoring system configured to author digital content, and a rendering system configured to render digital content.

38. The method of claim 24, further comprising manipulating, via a parser, said rights expressions.

39. The method of claim 38, further comprising facilitating processing, via said parser, of new rights expressions.

40. The method of claim 38, further comprising interfacing said parser with said framework to provide said manipulated rights expressions to said interpreter.

41. The method of claim 24, further comprising expanding said interpreter by adding additional plug-in subcomponents thereto.

42. The method of claim 41, further comprising evaluating, via said additional plug-in subcomponents, new rights expressions.

43. The method of claim 41, further comprising validating, via additional validators, compliance with conditions set forth in said new rights expressions.

44. The method of claim 24, further comprising validating, via additional validators, compliance with conditions set forth in new rights expressions.

45. The method of claim 24, further comprising, via the framework:
registering the interpreter and the validators into the framework;
identifying the interpreter and the validators corresponding to the rights expressions that the interpreter and the validators can process;
looking up the identified interpreter and validators,
invoking the identified interpreter and validators.

46. The method of claim 24, wherein the method is implemented with one or more hardware and software components.

47. The method of claim 24, wherein the method is implemented with one or more computer readable instructions embedded on a computer readable medium and configured to cause one or more computer processors to perform the steps of the method.

* * * * *